United States Patent
Le et al.

(10) Patent No.: US 11,999,009 B1
(45) Date of Patent: *__Jun. 4, 2024__

(54) LASER SYSTEM TO DRILL, CUT, OR MODIFY AN ELECTRONIC CIRCUIT

(71) Applicants: Khanh Le, Bellwood, IL (US); John Lekavich, Bellwood, IL (US); Bao Tran, Saratoga, CA (US)

(72) Inventors: Khanh Le, Bellwood, IL (US); John Lekavich, Bellwood, IL (US); Bao Tran, Saratoga, CA (US)

(73) Assignee: IntraAction Corp., Bellwood, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,058

(22) Filed: Apr. 7, 2023

Related U.S. Application Data

(63) Continuation of application No. 18/132,076, filed on Apr. 7, 2023, and a continuation of application No. 18/132,074, filed on Apr. 7, 2023, and a continuation of application No. 18/132,070, filed on Apr. 7, 2023, and a continuation of application No. 18/132,069, filed on Apr. 7, 2023, now Pat. No. 11,885,949, and a continuation of application No. 18/132,064, filed on Apr. 7, 2023, now Pat. No. 11,757,532, and a continuation of application No. 18/132,054, filed on Apr. 7, 2023, now Pat. No. 11,813,697, and a continuation of application No. 18/132,047, filed on Apr. 7, 2023, and a continuation of application No. 18/132,034, filed on Apr. 7, 2023, now Pat. No. 11,906,874, and a continuation of application No. 18/132,025, filed on Apr. 7, 2023.

(51) Int. Cl.
| | |
|---|---|
| *B23K 26/082* | (2014.01) |
| *B23K 26/067* | (2006.01) |
| *B23K 26/384* | (2014.01) |
| *H01S 3/117* | (2006.01) |
| *B23K 103/00* | (2006.01) |

(52) U.S. Cl.
CPC .......... *B23K 26/082* (2015.10); *B23K 26/067* (2013.01); *B23K 26/384* (2015.10); *H01S 3/117* (2013.01); *B23K 2103/56* (2018.08)

(58) Field of Classification Search
CPC .. B23K 26/082; B23K 26/067; B23K 26/384; B23K 2103/56; H01S 3/117
See application file for complete search history.

(56) References Cited

U.S. PATENT DOCUMENTS 3,759,603 A * 9/1973 Eschler .................. G02F 1/332
359/313
3,820,037 A * 6/1974 Corcoran .............. H01S 3/2308
372/19

(Continued)

*Primary Examiner* — Xinning (Tom) Niu
(74) *Attorney, Agent, or Firm* — PatentPC; Bao Tran

(57) ABSTRACT

A laser apparatus includes laser, a beam splitter, a phased array acousto-optic deflector (AOD) with one or more transducers, a damper, a galvano deflection unit, and a condensing lens to generate one or more laser beams directed at the electronic circuit. The Galvano deflection unit works with acousto-optic deflector includes an optical element having a surface with one or more steps formed thereon; a conductive layer formed on the surface with the steps; one or more crystals secured to each step; and electrodes positioned on each surface of each crystal.

20 Claims, 8 Drawing Sheets

(56) References Cited

U.S. PATENT DOCUMENTS

| | | | | | |
|---|---|---|---|---|---|
| 5,165,104 | A | * | 11/1992 | Weverka | G02F 1/335 |
| | | | | | 385/24 |
| 5,576,880 | A | * | 11/1996 | Chang | G02F 1/332 |
| | | | | | 359/305 |
| 7,697,195 | B2 | * | 4/2010 | Hill | G03F 7/70775 |
| | | | | | 359/305 |
| 2002/0032961 | A1 | * | 3/2002 | Matsuda | H05K 3/225 |
| | | | | | 29/846 |
| 2002/0067490 | A1 | * | 6/2002 | Okawauchi | G03F 7/70633 |
| | | | | | 356/614 |
| 2004/0257636 | A1 | * | 12/2004 | Shibuya | G02F 1/33 |
| | | | | | 359/305 |
| 2007/0215575 | A1 | * | 9/2007 | Gu | B23K 26/0624 |
| | | | | | 216/60 |
| 2017/0337809 | A1 | * | 11/2017 | Givner | F41G 1/35 |
| 2020/0052408 | A1 | * | 2/2020 | Rappaport | H01Q 21/0006 |
| 2020/0298344 | A1 | * | 9/2020 | Sakamoto | G02F 1/33 |

\* cited by examiner

LASER SYSTEM TO DRILL, CUT, OR MODIFY AN ELECTRONIC CIRCUIT

This application claims priority to co-pending, commonly filed applications on Apr. 7, 2023 with Ser. Nos. 18,132,025, 18,132,034, 18,132,047, 18,132,054, 18,132,058, 18,132, 064, 18,132,069, 18,132,070, 18,132,074, the contents of which are incorporated by reference.

BACKGROUND

The present invention relates to a laser system.

In the manufacture of printed circuit boards (PCBs), vias are holes that are drilled through the board to connect different layers of the circuit. Traditionally, the holes are made using a mechanical drilling process, which involves drilling the holes using a drill bit. However, this process has some limitations, which has led to the need for laser drilling in PCB via hole making.

One of the main problems with mechanical drilling is that it is difficult to create small, precise holes with high aspect ratios (the ratio of the hole depth to the diameter). As PCBs have become smaller and more complex, the demand for small, high-density vias has increased. Mechanical drilling can struggle to achieve the necessary precision and aspect ratios for these vias, leading to issues with signal integrity and manufacturing yield.

The use of laser drilling in PCB via hole making is becoming increasingly important in the manufacturing of high-density, high-performance PCBs. The ability to create small, precise holes with high aspect ratios can help to improve the performance and reliability of electronic devices. However, due to different via sizing, the energy required may vary.

FIG. 6 illustrates an example of a substrate that includes layers whose energy requirements for processing are different from each other. FIG. 6 shows an example of a substrate that has layers whose energy requirements are different. FIG. FIG. 6. This sectional view shows a substrate with a copper layer of 81 on its substrate surface and a resin layer of 82 laminated underneath the copper layer. Referring to 84, a copper layer is laminated underneath the resin layer. The copper layer requires more energy than the resin layer to be processed.

There are several conventional methods that can be used to process the copper layer 81, and the resin layer 82, at different positions on this substrate 1 using laser to create blind holes 83. A UV laser with a high absorption rate relative to copper is used. Processing for the copper layer is done at one hole as a first step. This process increases the energy density by making the diameter of a laser beam smaller. A mechanical laser deflection mechanism, such as a galvano scanner, successively irradiates laser at multiple locations along a predetermined track (or volute) that is not illustrated in the drawings. As shown in the middle illustration, trepanning is the process of successively irradiating multiple sites along a predetermined track at one hole position.

For the copper layer 81 in each hole position, the laser deflection mechanism or a mechanical table drive mechanism is used. This allows for similar trepanning processes. This is done by changing the focal position mechanically with a laser irradiation device. This reduces the energy density of the laser beam.

The table drive mechanism or the laser deflection mechanism are used to irradiate laser pulses to the trepanning processing hole position one or more times as a second step. The process of irradiating a hole position one or more times is called "punching processing".

The second stage of punching is the processing for the resin layer. This stage follows the second stage's punching. Each of the blind holes (83) has a depth that is at least the same as the copper layer 84. The second stage of punching processing is controlled so that the energy density of laser pulses does not damage copper layer 84. To perform the same punching process for all other holes, either the mechanical table drive mechanism or the laser deflection mechanism are used. The punching operation is terminated.

Conventionally, during the trepanning process for the copper layer 81, the mechanical laser deflection device irradiates the laser pulse at multiple locations along the predetermined spiral track at one hole position. It takes a lot of time. The second stage of the resin layer 82 processing involves more delay because the punching processing takes place in the same position as the first stage.

SUMMARY

In one aspect, a laser apparatus includes laser, a beam splitter, a phased array acousto-optic deflector (AOD) with one or more transducers, a damper, a galvano deflection unit, and a condensing lens to generate one or more laser beams directed at the electronic circuit. The Galvano deflection unit works with acousto-optic deflector includes an optical element having a surface with one or more steps formed thereon; a conductive layer formed on the surface with the steps; one or more crystals secured to each step; and electrodes positioned on each surface of each crystal.

In another aspect, a laser system includes a laser beam aimed at an acousto-optic deflector with an optical element having a surface with one or more steps formed thereon; a conductive layer formed on the surface with the steps; one or more crystals secured to each step; and one or more electrodes positioned on the surface of the one or more crystals.

In another aspect, a laser drill machine comprising a laser oscillator, a beam splitter, a phased array acousto-optic deflector (AOD), a damper, a galvano deflection unit, and a condensing lens, wherein the phased array AOD is configured to control the direction and focus of the laser beam for precise and efficient drilling of holes in printed circuit boards. The laser drill machine can further include a table driving unit for guiding the laser beam over the surface of the printed circuit board, wherein the precise control of the laser beam provided by the phased array AOD reduces the risk of heat damage to surrounding materials and components.

In a further aspect, a method for drilling via holes in printed circuit boards comprising the steps of: providing a laser drill machine comprising a laser oscillator, a beam splitter, a phased array acousto-optic deflector (AOD), a damper, a galvano deflection unit, and a condensing lens; positioning the printed circuit board on a table driving unit; and controlling the direction and focus of the laser beam using the phased array AOD to precisely and efficiently drill via holes in the printed circuit board.

Implementations of the above aspect can include one or more of the following. A tuning element can be used to match a predetermined impedance. The tuning element can provide an output impedance of 50 ohms for one use case. The tuning element can have inductive and capacitive passive components. In one embodiment, the tuning element can be a 1:1 balun, 4:1 transformer, a capacitor, and an inductor. The optical element comprises a slanted end. The tuning element matches a deflector output impedance at 40 MHz and at 60 MHz to a 50 ohm impedance. The slanted end can have a compound angle designed to drive the reflected sound field out of a laser beam working range so that no reflected sound wave can impact laser performance. In one specific design, the slanted end forms a 30 degree angle measured from a long side of the optical element to a short side of the optical element and the surface of the slanted end has a 2 degree slope. The optical element can be germanium, tellurium dioxide (TeO2), lithium niobate, PZT, fused silica, chalcogenide glasses, or glass, for example.

In another aspect, a method to form a phased-array transducer for laser cutting or drilling includes
grinding an optical element to form two or more steps each with a predetermined height;
depositing a conductive layer (gold) over the one or more steps;
attaching one or more crystals or transducers on the one or more steps;
attaching electrodes to the top and bottom of each transducer; and
using the phased-array transducer with a laser system to cut or drill an electronic board.

In another aspect, a method to deflect a laser beam includes:
applying the laser beam to an optical element having one or more steps each with a predetermined height and one or more crystals or transducers on the one or more steps;
impedance matching the electrical input of the transducers to a 50-ohm load;
providing an electrical input to deflect the laser at the two or more frequencies;
generating a sound field in the optical element to deflect a laser beam based on two or more frequencies; and
deflecting the laser beam to trim, cut or drill an electronic circuit.

Implementations of the above aspect can include one or more of the following. The method includes matching the input of the transducers to a predetermined impedance. A tuning element can be connected to the transducers with an output impedance of 50 ohms. The tuning element includes inductive and capacitive passive components. The tuning element can have a 1:1 balun, a 4:1 transformer, a capacitor, and an inductor. The optical element can have a slanted end, wherein the slanted end comprises a compound angle to move reflected sound field out of a laser beam working range. The slanted end forms a 30 degree angle measured from a long side of the optical element to a short side of the optical element. A surface of the slanted end has a 2 degree slope. The optical element comprises germanium, tellurium dioxide (TeO2), lithium niobate, PZT, fused silica, chalcogenide glasses, glass. The tuning element matches a deflector output impedance at 40 MHz and at 60 MHz to a 50 ohm impedance.

Implementations of the above aspect can include one or more of the following. The method includes tuning the electrical output for 40 MHz and 60 MHz output. A slanted end is formed on the optical element with a compound angle to move reflected sound field out of a laser beam working range. The slanted end forms a 30 degree angle measured from a long side of the optical element to a short side of the optical element. A surface of the slanted end comprises a 2 degree slope.

In another aspect, a method to form and to operate an opto-acoustic deflector includes:

grinding an optical element to form one or more steps each with a predetermined height;
depositing a conductive layer (gold) over the one or more steps;
attaching one or more crystals or transducers on the one or more steps;
attaching electrodes to the top and bottom of each transducer;
impedance matching the electrical input of the transducers to a 50-ohm load;
receiving an electrical input to deflect the laser at the two or more frequencies; and
generating a sound field in the optical element to deflect a laser beam based on two or more frequencies.

Implementations can include one or more of the following. The method can include tuning the electrical output for 40 MHz and 60 MHz output. The method includes forming a slanted end on the optical element. The method further includes forming a compound angle to move reflected sound field out of a laser beam working range. The slanted end forms a 30 degree angle measured from a long side of the optical element to a short side of the optical element. A surface of the slanted end comprises a 2 degree slope. The method includes grinding the optical element, which can be germanium, tellurium dioxide (TeO2), lithium niobate, PZT, fused silica, chalcogenide glasses, glass, among others.

Advantages of the system may include one or more of the following. The laser drill AOD device can operate with two distinct frequencies, for example at 40 and 60 MHz, resulting in a single device that can do the job of two. The overall laser driller thus is smaller, lower power, and higher matching behavior over versions that require two separate deflectors each geared toward a particular frequency. The AOD provides precise and efficient control over the direction of a laser beam. The laser machine when enhanced with the phased-array AOD enables laser drilling to achieve high aspect ratios and precise, small holes with greater accuracy and consistency. Laser drilling uses a focused laser beam to ablate material from the PCB substrate, creating the via hole. The laser beam can be precisely controlled to create holes of different sizes and shapes with high accuracy. The phased-array AOD in laser drillers also offers other advantages in PCB manufacturing applications, including the ability to drill through a wide range of materials, such as ceramics and metals, and the ability to create blind and buried vias, which are difficult to achieve with mechanical drilling. The use of phased array AODs in laser drilling and PCB via hole making enables in the manufacturing of high-density, high-performance PCBs. The ability to create small, precise holes with high aspect ratios can help to improve the performance and reliability of electronic devices.

DESCRIPTION

Figure 1A:
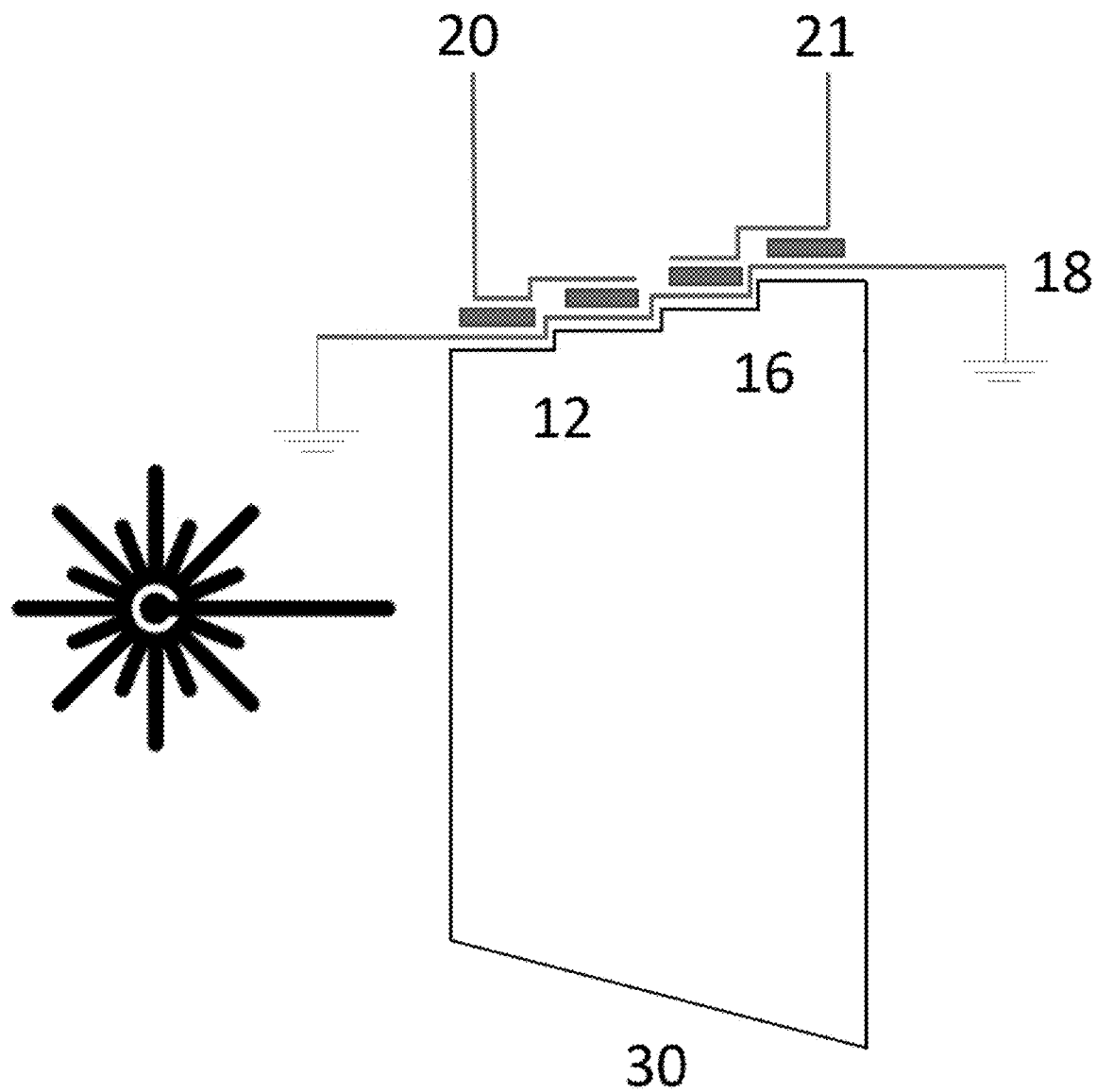
FIG. 1A-1B show an exemplary phased array opto-acoustic deflector.

FIG. 1A shows an exemplary phased array opto-acoustic system. In a phased array opto-acoustic system, a pulsed laser beam is used to generate acoustic waves in a sample chamber such as optical element that receives the laser beam. The laser beam path is altered by the sound generated by the opto-acoustic elements in a transducer coupled to the optical element.

Figure 1B:
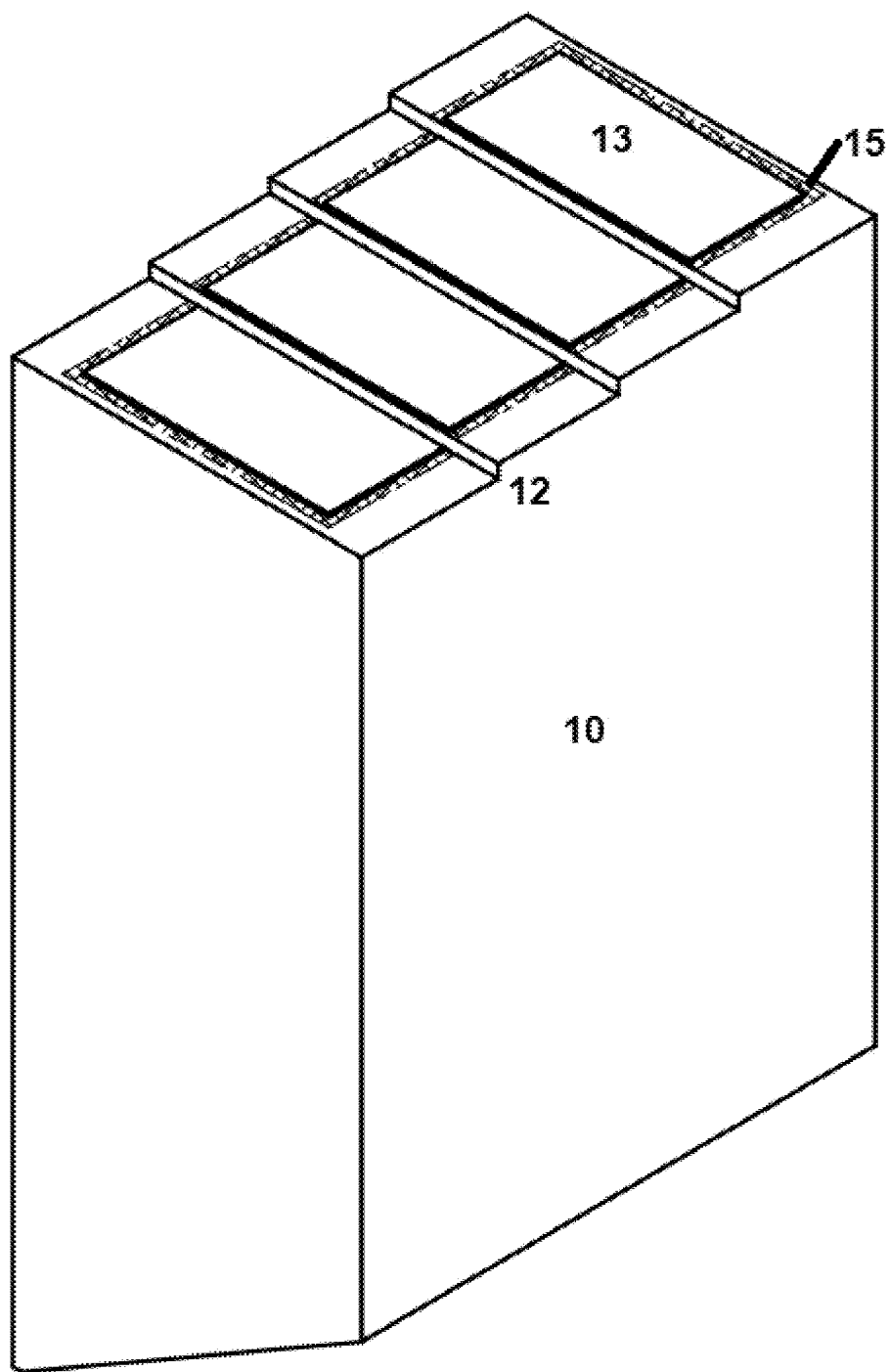

FIG. 1A-1B show a device 10 having stepped surfaces 12 and 16 on one end, and an angled end 30 opposite to the stepped surfaces 12 and 16. Turning now to FIG. 1A, an exemplary phase-array device includes an optical element having a surface with one or more steps formed thereon, where the optical element has at least two step heights. The different heights of the steps affect the acousto-optic RF frequency responses.

Transducers are mounted above the stepped surfaces 12 and 16, with one side of each transducer coupled to RF inputs 20-21 respectively, and the other side of the transducer connected to ground 18. The phased array transducer array has a plurality of transducers mounted on a top surface, with each transducer at a different height. Each transducer in the array is positioned at different vertical positions, such as at different heights above a sample chamber surface. One example of such an array is a linear transducer array, in which a linear array of transducers is arranged along a surface, with each transducer positioned at a different height. Another example is a 2D transducer array, in which a grid of transducers is positioned at different heights to form a 2D array.

As shown in FIG. 1B, the optical element 10 has a surface with one or more steps 12 formed thereon, where the height of each step on the surface of the optical element can be precisely controlled during the manufacturing process, which allows for the creation of specific acousto-optic frequency responses. The step height can be chosen to match the wavelength of RF input, creating a specific phase shift, or to provide a specific diffraction angle. The height of each step can also affect the coupling between the acoustic wave and the optical wave, which determines the efficiency and bandwidth of the acousto-optic interaction. Grinding or subtractive techniques can be applied to the surface of the optical element to form one or more steps spaced apart on the surface, where the height of each step effects the acousto-optic RF frequency response. This provides a versatile and precise tool for manipulating the interaction between acoustic waves and optical waves. This technology is useful in a variety of applications, such as laser beam modulation, scanning, and frequency shifting.

In some cases, the steps 12 on the surface of the optical element can have a plurality of different heights. This can be done to create a more complex RF frequency response, which can be useful for certain applications. Transducer 13 is adhesively bonded with a thin epoxy layer 15 to the top to steps 12. This is done when the device 10 is inserted into its spot in the receptacle of FIG. 4C, applying a thin layer of epoxy 15 on top of step 13, and then by operation of vacuuming the transducer 13 to secure it to the bottom of the piston and by air pressure lowering the piston with the top of step 12 and evenly apply the epoxy to secure the transducer 13 to device 10.

By having steps with different heights, the acousto-optic device can be designed to deflect light at multiple angles or frequencies. This can be used, for example, in laser scanning systems, where the deflection angle of the incident laser beam needs to be precisely controlled.

The optical and acoustic elements in a phased array opto-acoustic device are arranged in a specific pattern to allow for precise control of the acoustic waves generated and detected. The optical elements transmit the laser beam through the sample chamber. The acoustic elements may include a phased array of transducers, which are used to control the direction and intensity of the acoustic waves.

The AOD consists of an acousto-optic crystal, usually made of tellurium dioxide (TeO2) or fused silica, that is designed to interact with an acoustic wave generated by an RF signal. When a laser beam is directed through the crystal, the acoustic wave creates a spatially varying refractive index in the crystal, which diffracts the laser beam in a specific direction.

The deflection angle of the laser beam is determined by the frequency and amplitude of the RF signal used to generate the acoustic wave. By varying these parameters, the deflection angle of the laser beam can be adjusted to scan a specific area or to perform a specific task.

One of the applications of AODs is microscopy. AODs can be used to steer a laser beam through a sample to create a 2D or 3D image of the sample. This technique, known as laser scanning microscopy, allows for high-resolution imaging of biological samples and materials with minimal photodamage.

AODs are also used in laser printing, where they can be used to steer a laser beam to print high-resolution images and text onto a variety of materials, including paper, plastic, and metal.

In laser communication, AODs can be used to steer a laser beam between a transmitter and a receiver. This technique, known as free-space optical communication, allows for high-speed data transfer over long distances without the need for physical connections.

Figure 2A:
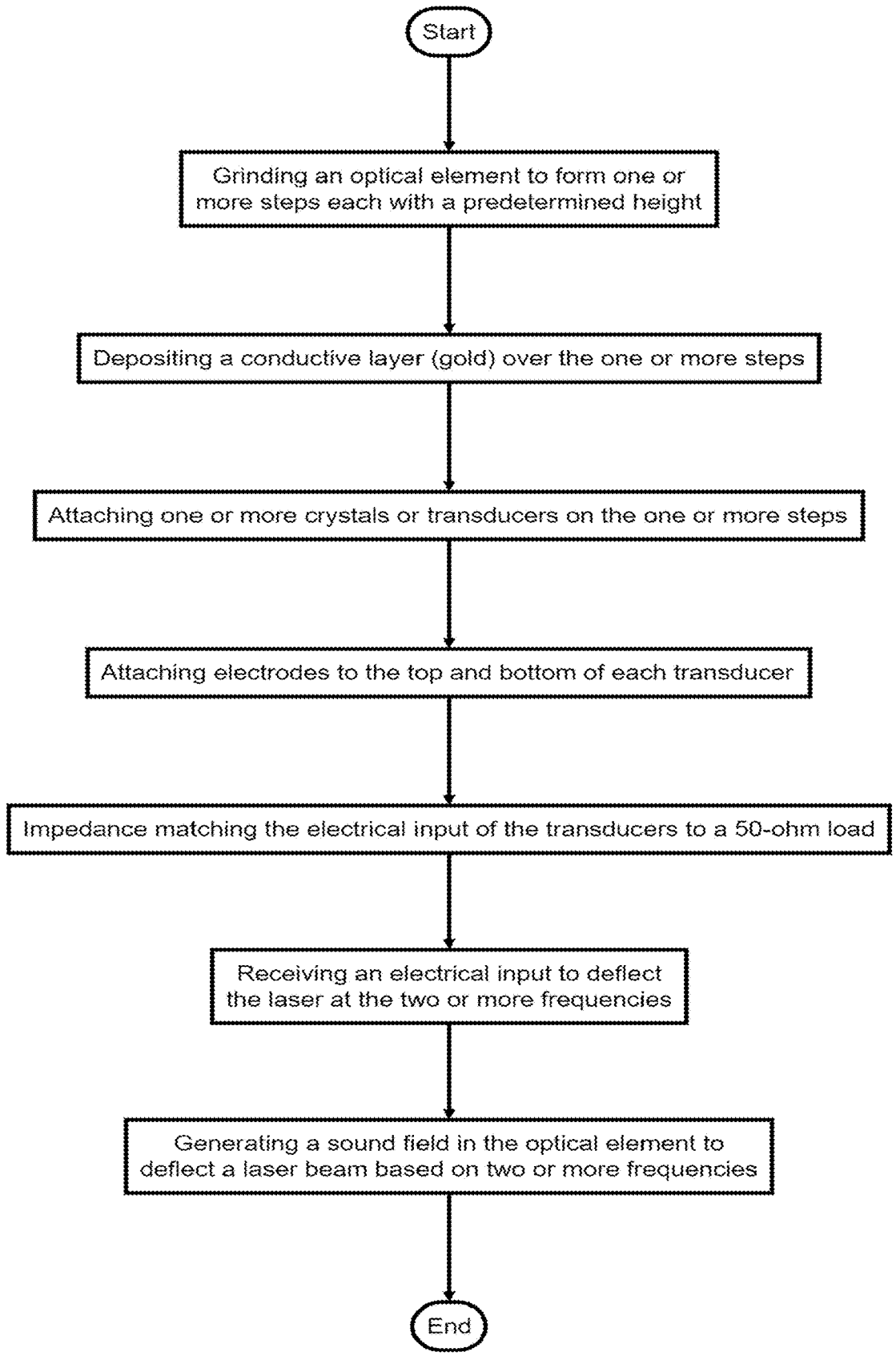
FIG. 2A-2B show exemplary processes for forming and using the deflector of FIG. 1

FIG. 2A shows an exemplary process to form a phased-array transducer. The process includes the following operations:
  grinding an optical element to form two or more steps each with a predetermined height;
  depositing a conductive layer over the one or more steps;
  attaching one or more crystals or transducers on the one or more steps; and
  attaching electrodes to the top and bottom of each transducer.

In more details, the process of creating steps with different heights on the surface of an optical element can be done using various techniques, including etching or grinding. Etching can be used to selectively remove material from the surface, while grinding can be used to selectively remove material from certain areas of the surface. The end result is a surface with steps of varying heights that can be used to control the RF frequency response of the acousto-optic device.

The tools used to grind the optical element with the steps may vary depending on the material of the optical element and the desired precision of the steps. Some common tools used for grinding optical elements include diamond-tipped tools, abrasive wheels, and lapping/polishing pads.

Diamond-tipped tools are often used for grinding hard and brittle materials such as glass and some ceramics. These tools are made of a thin metal shank with a small diamond grit on the tip. The diamond grit is used to scratch away material from the optical element, creating the desired steps. Diamond-tipped tools can achieve high precision and smooth surface finishes.

Abrasive wheels are another common tool used for grinding optical elements. These wheels are made of abrasive particles bonded to a wheel shape. The abrasive particles can be made of materials such as silicon carbide or aluminum oxide, and the bond can be made of materials such as resin or vitrified ceramic. Abrasive wheels are often used for grinding softer materials such as plastic or some metals. These wheels can remove material quickly but may not achieve the same precision as diamond-tipped tools.

Lapping and polishing pads are used for finishing the optical element after grinding. These pads are made of a soft material such as felt or polyurethane foam and are coated with a fine abrasive material such as diamond paste. The optical element is placed on the pad and moved in a circular motion to achieve a smooth surface finish.

Other tools that may be used for grinding optical elements include grinding machines, CNC equipment, and ultrasonic machining tools. The choice of tool depends on the material of the optical element, the desired precision, and the production volume.

Cleaning of the optical element surface is an essential step to ensure the adhesion of the subsequent gold layer. The cleaning operation typically involves the following steps:

Rinse the optical element with deionized water or a cleaning solvent to remove any loose particles or debris on the surface.

Immerse the optical element in a mild acid solution, such as hydrochloric acid or sulfuric acid, to remove any organic or inorganic contaminants. The duration of the immersion depends on the type and level of contamination and typically ranges from a few seconds to several minutes.

Rinse the optical element with deionized water to remove any residual acid and neutralize the surface.

Dry the optical element using a stream of dry nitrogen or argon gas or a cleanroom-compatible drying method such as spin-drying or vacuum-drying.

Inspect the optical element surface under a microscope or with a cleanroom-compatible surface analysis tool to ensure that the surface is free of particles, scratches, or defects that can affect the performance of the subsequent gold layer deposition.

By following these steps, the optical element surface can be prepared for the deposition of a uniform and adherent gold layer.

The height of each step on the surface of the optical element can be precisely controlled during the manufacturing process, which allows for the creation of specific acousto-optic frequency responses. The step height can be chosen to match the wavelength of the incident sound, creating a specific phase shift, or to provide a specific diffraction angle. The height of each step can also affect the coupling between the acoustic wave and the optical wave, which determines the efficiency and bandwidth of the acousto-optic interaction.

In an acousto-optic modulator, the applied RF signal modulates the frequency of the acoustic wave, which in turn modulates the phase or amplitude of the optical wave passing through the optical element. The modulation depth and frequency bandwidth of the modulator depend on the height and spacing of the steps on the optical element. The applied RF signal generates an acoustic wave that travels along the surface of the optical element, causing the incident optical beam to diffract at a specific angle. The applied RF signal modulates the frequency of the acoustic wave, which in turn modulates the phase or amplitude of the optical wave passing through the optical element.

A conductive layer is formed on the surface with the steps. In some cases, a conductive layer such as gold is deposited on the surface with the steps. This is done to allow for an electrical contact to be made with the surface, which is necessary for applying the RF signal to the acousto-optic device. The conductive layer also helps to reduce any unwanted reflections that may occur at the surface, which can affect the performance of the device.

First, a layer of nichrome is formed on the surface of the optical element since gold does not bond well with the optical element. Then a layer of gold is deposited above the nichrome layer. The conductive layer is typically deposited using a process called physical vapor deposition (PVD) or sputtering. In PVD, a thin film of gold is deposited on the surface by evaporating the metal in a vacuum chamber and allowing it to condense onto the surface. In sputtering, a plasma is used to eject gold atoms from a target material and deposit them onto the surface.

The equipment used to deposit a fine layer of gold over the steps on the optical element is called a physical vapor deposition (PVD) system. PVD is a process where a solid material is vaporized in a vacuum environment, and the resulting vapor condenses onto a substrate to form a thin film.

In this case, the gold is evaporated in a vacuum chamber using an electron beam gun or a resistive filament. The vaporized gold atoms travel in a straight line towards the substrate, where they condense and form a thin layer on the surface of the optical element. The thickness of the gold layer can be controlled by adjusting the deposition rate and the deposition time.

The PVD system typically includes a vacuum chamber, a substrate holder, a source of gold, and a means to evaporate the gold. The substrate holder is designed to hold the optical element with the steps facing upwards and is positioned in the vacuum chamber. The chamber is then evacuated to a high vacuum level, typically in the range of $10^{-6}$ to $10^{-7}$ torr, to prevent contamination of the gold layer.

The gold source is typically a solid piece of gold that is heated by an electron beam or a resistive filament. As the gold is heated, it evaporates and condenses on the surface of the optical element. The deposition rate and deposition time can be controlled by adjusting the power of the heating source and the distance between the source and the substrate.

Once the gold layer is deposited, the optical element is removed from the vacuum chamber and inspected for uniformity and thickness. The thickness of the gold layer is typically in the range of a few hundred nanometers to a few microns, depending on the application.

Overall, the PVD system is a precise and reliable method for depositing a thin layer of gold on the surface of the optical element with the steps, ensuring optimal performance of the acousto-optic deflector.

A transducer or a crystal is then affixed to each step, preferably at different heights based on the height of the steps. The crystal is secured to each step of an optical element using epoxy bonding in one embodiment. The crystal is placed in contact with the conductive layer on the surface of the optical element. Electrodes positioned on each surface of each crystal, one connected to ground and one connected to an RF signal driving the crystal.

After the conductive layer is deposited and the crystal affixed to the optical element, electrical contacts are typically made to the surface using wire bonding or other techniques. Electrodes are then connected to each side of the crystal. Energy applied to the crystal generates an acoustic wave in response to an applied RF signal, and the electrodes are used to apply the RF signal to the crystal. An RF signal is then applied to the contacts, which generates the acoustic wave that modulates the refractive index of the acousto-optic material and deflects the incident light.

The electrodes are made of a conductive material, such as gold or aluminum, and are placed on opposite sides of the crystal. When an RF signal is applied to the electrodes, it generates an acoustic wave in the crystal, which can then be used to modulate the laser beam applied to the optical element.

An RF signal applied to the crystal would generate an acoustic wave, which would propagate through the crystal and into the optical element. The acoustic wave would then modulate the refractive index of the optical element, causing it to diffract or deflect an incident beam of light.

The positioning and design of the electrodes can be critical to the performance of the acousto-optic device. The spacing between the electrodes, the shape of the electrodes, and the applied voltage all affect the frequency response of the device.

Figure 2B:
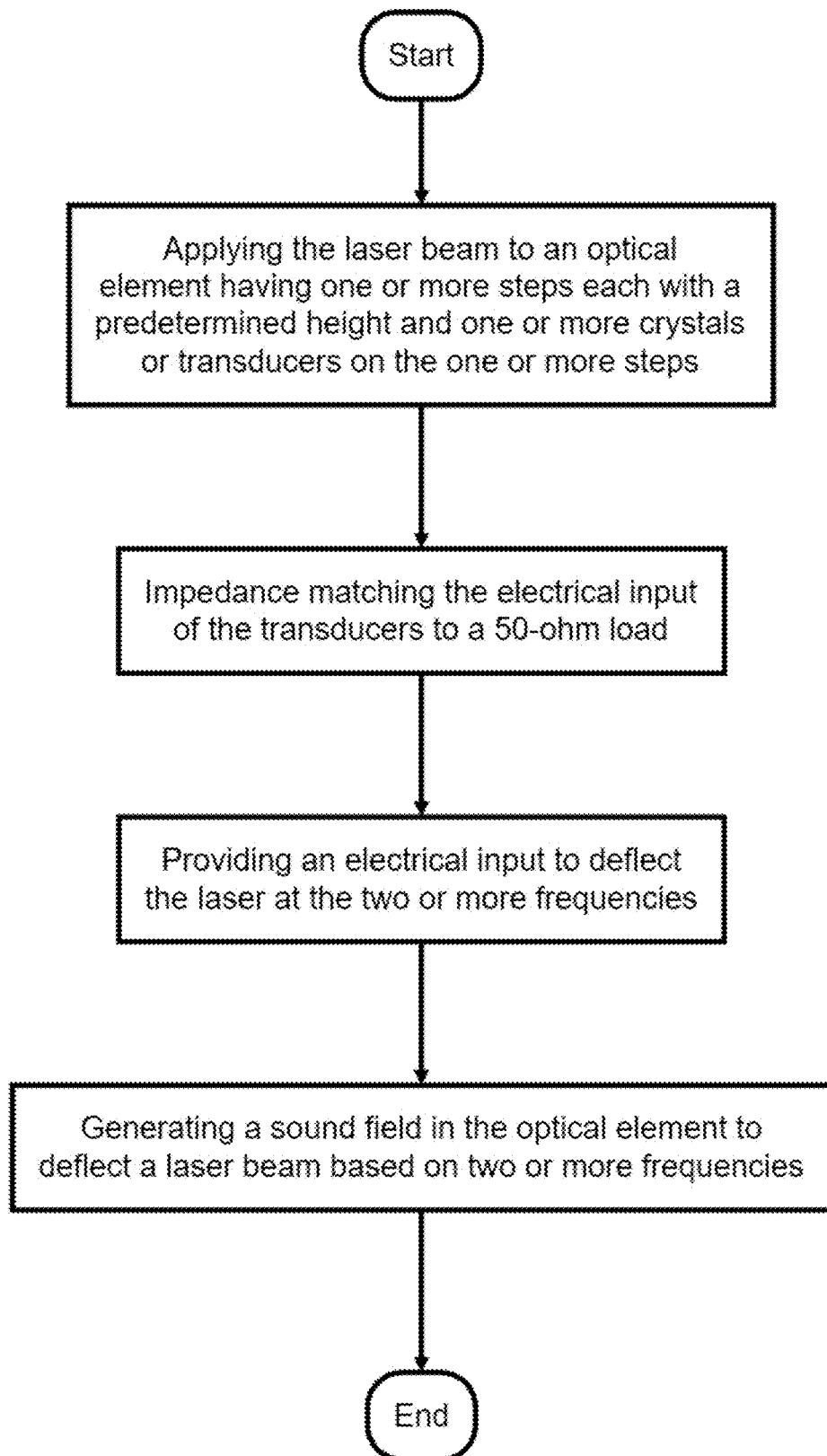

FIG. 2B shows an exemplary method to deflect a laser beam that includes:
  applying the laser beam to an optical element having one or more steps each with a predetermined height and one or more crystals or transducers on the one or more steps; impedance matching the electrical input of the transducers to a 50-ohm load;
  providing an electrical input to deflect the laser at the two or more frequencies; and generating a sound field in the optical element to deflect a laser beam based on two or more frequencies.

Other methods to form an opto-acoustic deflector include:
  grinding an optical element to provide one or more steps each with a predetermined height;
  depositing a layer of gold over the one or more steps; and
  attaching one or more crystals or transducers on the one or more steps.

Figure 3:
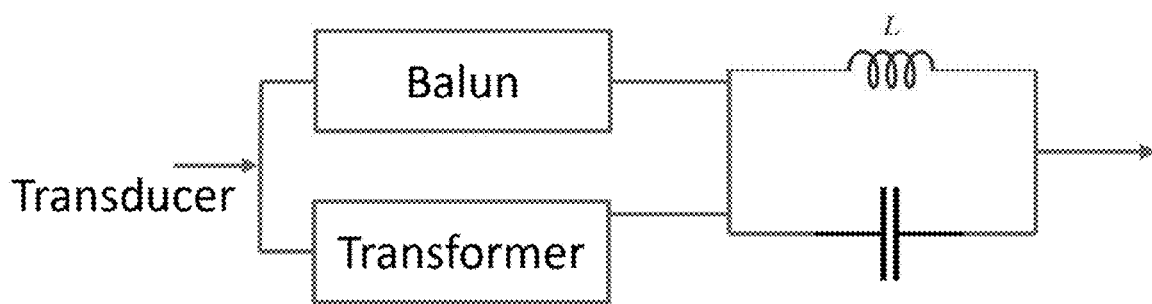
FIG. 3 shows an exemplary tuning element that is coupled to the electrodes to match a predetermined impedance.

FIG. 3 shows an exemplary tuning element that is coupled to the electrodes to match a predetermined impedance. The tuning element is used to match the predetermined impedance of the acousto-optic phased array transducers. The tuning element is typically an inductor with a predetermined coil length and a variable capacitor or a trimmer capacitor that is adjusted to match the impedance of the system. This is important to ensure maximum power transfer between the amplifier and the acousto-optic deflector, which leads to better performance and efficiency. The tuning element can be adjusted by a technician or can be automated using a feedback control loop to continuously monitor and adjust the impedance.

The tuning element is typically used to match the impedance of the acousto-optic deflector to the impedance of the driving circuit, which is often 50 ohms. This ensures maximum power transfer between the amplifier and the acousto-optic deflector. The impedance matching can help to minimize the reflection of the signal, which can cause unwanted interference and signal degradation.

The tuning element can be used to match the impedance of the acousto-optic deflector at specific RF frequencies to a 50-ohm impedance. This is typically done using a matching network or filter, which can be adjusted to achieve the desired impedance match. For example, if the deflector has an output impedance of 40 MHz and 60 MHZ, a tuning element can be designed to match those frequencies to 50 ohms.

The tuning element can be implemented using various techniques, such as a lumped element filter, a distributed element filter, or a combination of both. The choice of technique depends on various factors such as the frequency range, the required bandwidth, and the physical size of the tuning element.

Once the tuning element is designed, it can be coupled to the electrodes of the acousto-optic deflector to achieve the desired impedance match. This can be done using various coupling techniques such as wire bonding or soldering. The impedance match ensures that maximum power is transferred from the RF amplifier to the acousto-optic deflector, which improves its efficiency and performance.

Opposite to the surface with the steps on the optical element is a slanted end with a compound angle to direct any reflected sound field away from the laser beam working range. This can help to reduce unwanted interference and improve the overall performance of the acousto-optic deflector. The compound angle can be designed to achieve the desired deflection angle for the laser beam while also minimizing any unwanted reflections or diffraction effects. The exact design of the slanted end will depend on the specific application and requirements of the acousto-optic deflector.

To prevent these issues, it is important to carefully control the deposition process and ensure that the gold layer is well adhered to the optical element's surface. Additionally, the amount of epoxy used should be carefully controlled and optimized to ensure strong bonding between the crystals and the surface without creating unnecessary attenuation of the acoustic waves. Quality control and testing should also be performed to ensure that the opto-acoustic deflector meets the required specifications for performance and reliability.

To form a slanted end of the optical element with a 30 degree angle measured from a long side to a short side and a surface with a 2 degree slope, the following steps can be taken:
  Obtain an optical element made of the desired material, such as germanium or tellurium dioxide (TeO2).
  Determine the dimensions of the optical element and mark the area where the slanted end will be located.
  Use a precision saw or cutting tool to cut the slanted end at the desired angle. This can be done by tilting the cutting tool at a 30 degree angle relative to the long side of the optical element.
  Use a precision grinding tool, such as a diamond or abrasive wheel, to grind the surface of the slanted end to achieve the desired 2 degree slope. This can be done by adjusting the angle and pressure of the grinding tool.
  Inspect the surface of the slanted end to ensure that it is smooth and free of any cracks or defects.
  Clean the surface of the slanted end using a gentle solvent, such as isopropyl alcohol, to remove any debris or particles.
  Optionally, apply a protective coating, such as a thin layer of anti-reflection coating or a metal film, to the surface of the slanted end to improve its optical properties and prevent damage from handling or exposure to the environment.

Overall, the key to forming a slanted end with the desired angle and slope is to use precision tools and techniques to achieve the desired shape and surface quality, while minimizing any damage or stress to the optical element.

The optical element can be germanium, tellurium dioxide (TeO2), lithium niobate, PZT, fused silica, chalcogenide glasses, glass. The choice of material for the optical element depends on various factors such as the desired optical properties, thermal and mechanical stability, and the specific application for which the element will be used.

The choice of crystal for an opto-acoustic laser system depends on the specific application and the properties of the crystal. Some of the factors that are typically considered when selecting a crystal for opto-acoustic applications include the crystal's acoustic and optical properties, as well as its thermal and mechanical stability, among others. One commonly used crystal for opto-acoustic applications is lithium niobate (LiNbO3). LiNbO3 has excellent acoustic properties, with a high acoustic velocity and a low acoustic attenuation, which makes it ideal for generating and detecting acoustic waves. It also has strong nonlinear optical properties, which can be used for frequency conversion and modulation of the laser beam.

Another crystal that is commonly used for opto-acoustic applications is quartz (SiO2). Quartz has a high acoustic velocity and a low acoustic attenuation, making it ideal for acoustic wave generation and detection. It is also highly transparent in the infrared region, which is useful for many laser applications.

Other crystals that are sometimes used for opto-acoustic applications include gallium arsenide (GaAs), gallium nitride (GaN), and sapphire (Al2O3). These crystals have specific properties that make them suitable for certain applications, such as high-temperature stability or high optical nonlinearity.

The choice of crystal for an opto-acoustic laser system depends on the specific requirements of the application, such as the desired acoustic and optical properties, as well as the thermal and mechanical stability of the crystal.

Some commonly used materials for acousto-optic devices include:

Germanium: Germanium is a common material for acousto-optic modulators operating in the mid-infrared region due to its high refractive index and low absorption coefficient in this range.

Tellurium dioxide (TeO2): TeO2 is a widely used material for acousto-optic devices due to its high electro-optic coefficient and wide transparency range from UV to mid-infrared.

Lithium niobate (LiNbO3): LiNbO3 is a well-known electro-optic material with high electro-optic coefficients, making it a popular choice for high-speed acousto-optic modulators and deflectors.

PZT: PZT or lead zirconate titanate is a piezoelectric material with high coupling coefficients, making it an ideal choice for transducers in acousto-optic devices.

Fused silica: Fused silica has a high laser damage threshold and low coefficient of thermal expansion, making it suitable for high-power applications.

Chalcogenide glasses: These are glasses containing elements from the chalcogen group such as sulfur, selenium, and tellurium. They have high refractive indices, wide transparency ranges, and are suitable for acousto-optic devices in the mid-infrared range.

Glass: Different types of glasses can be used for acousto-optic devices depending on the specific application and desired properties. For example, borosilicate glass is commonly used for high-power applications, while crown glass is used for its high refractive index.

Next, a description of the process to form an opto-acoustic deflector is detailed. The operation includes the following:

Grinding the Optical Element: The first step is to grind the optical element to provide one or more steps, each with a predetermined height. This step involves precise grinding to create the desired step heights for optimal acousto-optic performance.

Deposition of Conductive Layer: After grinding, a layer of gold is deposited over the one or more steps of the optical element. To improve bonding of the gold to the optical layer, a layer of nichrome is first deposited on the optical element, and the gold conductive layer is subsequently formed. The gold layer provides a conductive surface that can be used for attachment of the crystals or transducers.

Attachment of Crystals or Transducers: One or more crystals or transducers are attached on the one or more steps of the optical element. These crystals or transducers generate acoustic waves that interact with light passing through the optical element and deflect it in a controlled manner. The attachment process can involve a variety of techniques, such as epoxy bonding, soldering, or mechanical clamping.

Capturing Electrical Output: Electrical signals are generated by the crystals or transducers when they are subjected to acoustic waves. These electrical signals are captured using specialized electronics designed to amplify and process them for further analysis.

Impedance Matching: The final step is to impedance match the electrical output to a 50-ohm load. This involves the use of a tuning element such as a matching network or a transformer, which helps to adjust the impedance of the electrical signal to match the required load. This step is critical to ensure maximum power transfer and minimum signal loss.

Once the impedance matching is complete, the opto-acoustic deflector is ready for use. It can be integrated into various optical systems to deflect and control light with high precision, making it useful for a variety of applications such as laser printing, holography, and optical communication.

In the context of a transducer array with each transducer at a different height, it is possible to achieve the height difference by grinding the surface on which the transducers are mounted to create a stepped profile. This can be accomplished using precision grinding tools and techniques, such as diamond grinding or abrasive blasting.

The grinding process involves removing material from the surface in a controlled manner to create a series of steps or terraces with different heights. The transducers can then be mounted on the surface at the desired heights, with each transducer positioned on a different terrace. The height difference between the transducers can be controlled by adjusting the height and spacing of the terraces during the grinding process.

Grinding can be a precise and effective method for creating a stepped surface with controlled heights for a transducer array. The result of the grinding process forms a set of pedestals to mount transducers to the pedestal array, with at least two transducers with different heights.

Attaching a transducer to a surface of the steps can be done using an epoxy spread in an even and thin manner. This method involves applying a layer of epoxy or other adhesive material to the surface and then placing the transducer on top of the adhesive. The epoxy is then allowed to cure, creating a strong and permanent bond between the transducer and the surface.

As each transducer may be positioned at a different height, an array of spreaders can be used to apply the epoxy to the surface in a controlled and uniform manner. Each application head can be customized according to the desired height, allowing the epoxy to be applied to specific areas of the surface to create the desired stepped profile. The use of an array of spreaders, each with self adjustable heights, can provide a high degree of control and precision in the placement of the transducers, allowing for a more uniform and consistent array. However, specialized equipment is needed to create and operate the array of individually pliant spreaders so that each spreader automatically conforms to the different step heights.

The array of individually pliant spreaders can be pneumatically actuated to allow for precise control over the height of each transducer in the array. Pneumatic actuation involves using compressed air to control the movement of the spreaders and to stop them at the desired height for each surface portion.

By using pneumatic actuation with the pliant or conformal heads, the spreaders can be controlled to stop at the exact height required for each transducer, allowing for an even spread of the epoxy and a precise positioning of the bonding pressure on the transducers to ensure optimum bond between the transducer and the corresponding step on the optical element. This method can be particularly useful for creating an array with a plurality of transducers, as it allows for the process to be automated and ensures a consistent and accurate result.

The use of pneumatically actuated spreaders also offers other advantages over manual methods, such as greater speed, efficiency, and repeatability. It can also reduce the risk of human error and variability in the epoxy spreading process, which can lead to more consistent and reliable results.

Using pneumatically actuated spreaders to create a transducer array with each transducer at a different height can be a viable option for applications that require precise and uniform positioning of the transducers. The suitability of this method will depend on the specific requirements of the application and the available resources and expertise.

Attaching the crystals or transducers to the layer of gold on the optical element can be done through several methods, including ultrasonic bonding, thermal compression bonding, or epoxy bonding.

Ultrasonic bonding involves placing the crystal or transducer onto the layer of gold and using ultrasonic waves to generate heat and create a bond between the two materials. This method is commonly used for smaller crystals and transducers.

Thermal compression bonding involves applying heat and pressure to the crystal or transducer, causing it to bond with the layer of gold. This method is commonly used for larger crystals and transducers.

Epoxy bonding involves applying a small amount of epoxy adhesive to the crystal or transducer and placing it onto the layer of gold. The adhesive is then cured, creating a strong bond between the crystal or transducer and the gold layer.

Regardless of the method used, care should be taken to ensure that the crystal or transducer is properly aligned with the gold layer to ensure optimal performance of the opto-acoustic deflector.

The thickness of the epoxy layer used to attach the crystals to the layer of gold in an opto-acoustic deflector must be as thin as possible for several reasons:

Minimizing acoustic attenuation: The epoxy layer can attenuate the acoustic wave generated by the transducer, which can reduce the deflection efficiency of the device. A thinner epoxy layer can minimize the attenuation of the acoustic wave and improve the device's performance.

Avoiding acoustic interference: The epoxy layer can also cause acoustic interference, particularly if it is too thick. This interference can result in unwanted diffraction or scattering of the acoustic wave, which can also reduce the device's performance. A thinner epoxy layer can help to avoid this problem.

Minimizing optical distortion: The epoxy layer can also introduce optical distortion due to its refractive index. This distortion can be particularly problematic if the optical element is used in a laser beam steering application where precise control of the beam direction is critical. A thinner epoxy layer can help to minimize this distortion and improve the device's performance.

Overall, a thinner epoxy layer can help to improve the efficiency, accuracy, and reliability of an opto-acoustic deflector.

The process of applying an ultra-thin layer of epoxy involves several steps, including:

Preparation: The surface of the gold layer on the optical element must be thoroughly cleaned to remove any contaminants that may interfere with the adhesion of the epoxy. This can be done using a combination of solvents and ultrasonic cleaning.

Mixing: The epoxy is typically a two-part adhesive that must be mixed together in precise proportions. This is often done using a syringe or other dispensing device to ensure accuracy.

Dispensing: Once mixed, the epoxy is dispensed onto the surface of the gold layer. To achieve an ultra-thin layer, a dispensing device with a small aperture is typically used.

Spreading: The epoxy is spread evenly across the surface of the gold layer using a micro-manipulator or other precision tool. This must be done carefully to avoid creating air bubbles or other imperfections.

Curing: Once the epoxy has been applied, it must be cured according to the manufacturer's instructions. This typically involves heating the optical element to a specific temperature for a set amount of time.

By using precise dispensing and spreading techniques, it is possible to apply an ultra-thin layer of epoxy that is only a few microns thick. This is important for acousto-optic devices because it minimizes any interference that the epoxy layer may have on the performance of the device.

Delamination of the gold layer and epoxy failure can both be potential issues in the manufacturing process of an opto-acoustic deflector. Gold delamination can occur due to poor adhesion between the gold layer and the optical element's surface. This can be caused by inadequate cleaning of the surface before deposition, or by the use of inappropriate conditions during the deposition process. If the gold layer delaminates, it can cause the crystals to detach from the surface, resulting in the failure of the entire device. Epoxy failure can occur due to a number of factors. One issue can be improper mixing of the epoxy, leading to inconsistencies in the hardness and adhesive properties of the epoxy. Another issue can be the use of too much or too little epoxy, which can affect the bonding strength and stability of the crystals. In addition, if the epoxy layer is too thick, it can lead to acoustic wave attenuation, reducing the efficiency of the opto-acoustic deflector.

If the epoxy layer is too thick, it can create several issues in the opto-acoustic deflector. Firstly, a thick layer of epoxy can cause an uneven surface, which can affect the optical properties of the deflector. This can result in distortion, scattering, or attenuation of the laser beam passing through the deflector. Secondly, a thick layer of epoxy can increase the distance between the crystal and the gold layer, which can affect the efficiency of the acousto-optic interaction. This can result in lower deflection efficiency, higher power consumption, or increased heat generation.

Additionally, a thick layer of epoxy can cause mechanical stress on the crystal and the gold layer. As the epoxy cures, it can generate heat and shrink, which can cause the crystal or the gold layer to deform or crack. This can affect the stability, reliability, and lifetime of the opto-acoustic deflector.

To avoid these potential problems, it is important to apply a thin and uniform layer of epoxy on the steps of the deflector surface. This can be achieved by using a precision dispenser, a flat blade or a roller to spread the epoxy evenly. The thickness of the epoxy layer should be controlled within a certain range, depending on the type and viscosity of the epoxy, the height and pitch of the steps, and the required optical and mechanical properties of the deflector. Typically, the thickness of the epoxy layer can be in the range of a few micrometers to tens of micrometers, depending on the application requirements.

In one embodiment, a method for securing crystals to a gold plated optical element includes: placing each crystal on a moveable pedestal mounted on a piston;
   temporarily securing each crystal to the moveable pedestal;
   applying an epoxy to a plurality of steps on a deflector surface;
   placing the piston with the crystals over the plurality of steps;
   actuating the piston and moving each moveable pedestal to contact the crystal with the epoxy;
   releasing the crystal from the moveable pedestal; and
   curing the epoxy to secure the crystal to the steps.

The method for securing crystals to a gold plated optical element using epoxy involves the following The method for securing crystals to a gold plated optical element using epoxy involves the following steps:

Placing each crystal on a moveable pedestal mounted on a piston: The crystals are carefully placed on a moveable pedestal which is mounted on a piston that is capable of moving up and down.

Temporarily securing each crystal to the moveable pedestal: To prevent the crystals from falling off during the assembly process, they are temporarily secured to the moveable pedestal using a small amount of wax or adhesive.

Applying an epoxy to a plurality of steps on a deflector surface: A small amount of epoxy is applied to a plurality of steps on the deflector surface. It is important to apply the epoxy thinly and evenly to avoid any inconsistencies in the final assembly.

Placing the piston with the crystals over the plurality of steps: The piston, with the crystals mounted on the moveable pedestals, is carefully lowered over the plurality of steps on the deflector surface.

Actuating the piston and moving each moveable pedestal to contact the crystal with the epoxy: The piston is actuated to move each moveable pedestal, and the crystals are brought into contact with the epoxy on the steps of the deflector surface.

Curing the epoxy to secure the crystal to the steps: Once the crystals are in place, the epoxy is cured. This is typically done by heating the assembly to a specific temperature for a specified amount of time. The curing process ensures that the crystals are securely attached to the deflector surface.

It is important to note that the entire assembly process should be carried out in a clean environment, free of dust and other contaminants, to avoid any potential issues with the final product. Additionally, care should be taken to ensure that the crystals are properly aligned with the deflector surface to avoid any misalignment issues during use.

Due to the steps with variable heights, the piston is a gimbal that can move in x and y axis to apply controlled pressure to the crystals and to spread the epoxy as thin as possible. The use of a gimbal allows for precise movement of the piston in both the x and y directions, which helps to ensure that each crystal is pressed evenly onto the deflector surface even where different step heights are involved, and that the epoxy is spread evenly across the steps. This is important for achieving a strong and reliable bond between the crystals and the deflector surface, as well as for ensuring that the crystal positions are aligned correctly. The gimbal can also be used to adjust the pressure and angle of the crystals, which can be important for optimizing the performance of the opto-acoustic deflector.

Figure 4:
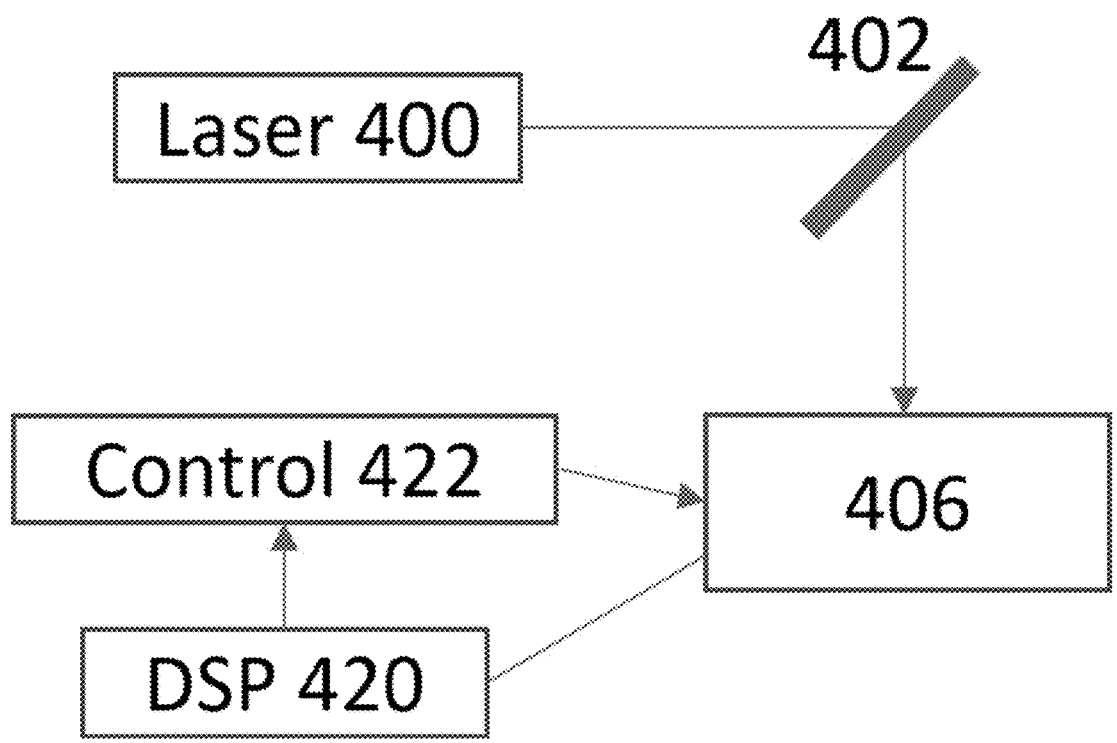
FIG. 4 shows an exemplary opto-acoustic laser system.

FIG. 4 shows an exemplary opto-acoustic laser system, which is a type of system that combines optical and acoustic techniques for a range of applications, such as sensing, imaging, and spectroscopy. Some of the main components of an opto-acoustic laser system include:

Laser source 400: A laser source is used to generate the optical radiation that interacts with the sample. Different types of lasers can be used, depending on the specific application, such as pulsed or continuous wave (CW) lasers.

Optical components: 402 Optical components are used to guide, focus, and manipulate the laser beam. These may include mirrors, lenses, polarizers, and filters.

Acoustic transducers 406: Acoustic transducers are used to generate and detect acoustic waves that are produced by the interaction of the laser beam with the sample. These can be piezoelectric transducers, optical fibers, or other types of sensors. A sample chamber is the region where the laser beam interacts with the sample. Preferably the sample chamber is inside an optical element such as element 10 of FIG. 1, but in other applications the sample chamber can be a gas cell, a liquid cell, or a solid-state sample holder, depending on the application.

Signal processing and data acquisition 420: Signal processing and data acquisition systems are used to analyze the acoustic signals generated by the interaction of the laser beam with the sample. These systems may include amplifiers, filters, and data acquisition cards.

Control electronics 422: Control electronics are used to synchronize the laser and acoustic pulses, as well as to control the various components of the system, such as the laser power, acoustic frequency, and detection settings.

The phased array opto-acoustic system is a type of opto-acoustic imaging system that uses an array of optical and acoustic elements to generate and detect acoustic waves for imaging and sensing applications.

When an RF frequency acoustic wave propagates inside an optically transparent medium, a periodic change in the refractive index occurs due to the compressions and rarefactions of the sound wave. This periodic variation produces a grating capable of diffracting an incident laser beam.

Two types of diffraction can occur:
Operation as a Raman-Nath device occurs when the laser beam enters the sound field at normal incidence and the light-sound interaction length $L < \Lambda^2/\lambda$, where $\lambda$ is
the laser wavelength in the medium and $\Lambda$ is the sound wavelength which is analogous to the line spacing of a thin diffraction grating. Klein and Cook[1] have defined a parameter Q $$Q = 2\pi\lambda LF^2/nV^2$$

where F is the RF acoustic frequency, n the index of refraction, and V the acoustic velocity of the interaction medium. For a Q value of approximately 4 or less operation is said to be in the Raman-Nath region. Operation in this mode is characterized by the fact that many diffracted orders are generated and the maximum amount of light in any of the diffracted orders is limited to approximately 35 percent. This type of device is typically used as a loss modulator for intracavity applications that require light to be removed from the zero order or undiffracted beam passing straight through the device; for applications such as q-switching.

Operation as a Bragg device occurs when $L>\Lambda^2/\lambda$ or according to Klein-Cook when Q is approximately 7 or greater. In this mode the incident laser beam should enter the sound field at the Bragg angle $$\theta_B = \lambda/2\Lambda$$

Maximum diffraction efficiency occurs when the incident laser beam and the first order diffracted beam are adjusted to form symmetrical angles with respect to the acoustic wavefronts. Depending upon design, up to 90 percent of the incident light can be diffracted into one order. Since acousto-optic devices are not 100 percent efficient, all of the light cannot be removed from the zero order. Since no light remains in the first order when the sound power is removed, the first diffracted order is used in applications such as amplitude modulation which require a high extinction ratio.

Amplitude modulation is detailed next. Beam separation or angular deviation between zero and first order is twice the Bragg angle $$\theta = 2\theta_B = \lambda F/V$$

The separation is proportional to acoustic frequency with a higher center frequency giving greater separation. The percentage of light $1_1$ in the first order or diffraction efficiency is given by $$\eta = I_1/I = \sin^2(2.22[1/\lambda^2(L/H)M_2P_a]^{1/2})$$

Diffraction efficiency is proportional to acoustic power (Pa), acousto-optic interaction material figure of merit (M2), sound field length to height aspect ratio (L/H), and inversely proportional to the square of the optical wavelength (1/0.2).

Since the diffraction process is a $\sin^2$ function please note that it is possible to overdrive the modulator resulting in decreased diffraction efficiency. Also note that since efficiency is inversely proportional to optical wavelength, longer wavelengths will require more RF drive power (P), and shorter wavelengths will require less RF drive power. Drive power can be determined for optical wavelengths different from the test condition wavelength by $$P_1/P_2 = k(\lambda_1/\lambda_2)^2$$

Rise time, Tr, is the time interval for the light intensity to go from 10% to 90% of maximum value in response to an acoustic step function. Rise time for a Gaussian laser beam is given by $$Tr = 0.64 D/V = 0.64 T$$

where T is the transit time of the acoustic wave across a laser beam of diameter D.

The frequency response of an acousto-optic modulator can be characterized by the modulation index or depth of modulation (M) which can be calculated for a sinusoidal input $$M = \exp(-\pi^2 f_m^2 T^2/8).$$

The 50% depth of modulation or −3 db modulation bandwidth occurs when fmT=0.75 where fm is modulation frequency.

When viewing photodiode current (see FIG. 5) on an oscilloscope, the Depth of Modulation can be calculated from the maximum intensity (Imax) and minimum intensity (Imin) readings displayed $$M = (I\max - I\min)/(I\max + I\min)$$

or in terms of contrast (C) where $$C \equiv I_{max}/I_{min}$$

$$M = (C-1)/(C+1).$$

Optical frequency shifting can be done. Because the acoustic wave travels across the optical beam, the optical frequency undergoes a Doppler shift by an amount equal to the acoustic frequency. The Modulator can up-shift or down-shift the optical frequency depending on the orientation of the optical beam in relation to the sound field. If the laser beam enters the sound field at the Bragg angle in opposition to the direction of the sound field, the optical frequency is up-shifted (plus first order) and if the beam enters at the Bragg angle in the same direction as the sound field, the optical frequency is down-shifted (minus first order).

Deflection is detailed next. Since the angular position of the first order beam is proportional to acoustic frequency, an incremental frequency change will produce an incremental angular deviation $$\Delta\theta = \lambda \Delta F/V$$

Total deviation is limited by the transducer electrical bandwidth.

Deflector resolution N, the number of resolvable beam positions across the total scan angle is defined as the total scan angle divided by the diffraction spread of the laser beam. For a uniformly illuminated optical beam $$N = (\lambda \Delta F/V)/(\lambda/D) = (D/V)\Delta F = \tau \Delta F$$

Since r is the transit time of the acoustic wave across the beam diameter D and IIF is the RF bandwidth of the device, the product of the two is called Time Bandwidth product. Since r is the time for sound to fill or clear the optical aperture, it limits the spot position access time in a random access application.

The far field light intensity pattern for the deflected beam is a $(\sin x/x)2$ function. By the Rayleigh Criterion the above resolution occurs when the maximum intensity at one beam position coincides with the intensity minimum at an adjacent beam position.

Changing frequency from the nominal center RF frequency to deflect the laser beam destroys the Bragg angle symmetry condition for efficient diffraction efficiency, resulting in reduced diffraction efficiency at the edges of the scan bandwidth. Incorporating acoustic phased array beam steering in the deflector design will maintain a high diffraction efficiency across the total deflection bandwidth since the acoustic wavefronts effectively rotate in response to a change in frequency to maintain the proper Bragg condition. Acoustic phased array beam steering is accomplished by mechanically cutting into the glass a series of small steps which are one half of an acoustic wavelength high at center frequency and phasing adjacent piezoelectric transducers 180 degrees apart. This technique causes the acoustic wavefronts to effectively rotate in response to a change in applied RF frequency. Because of the beam steering high uniform diffraction efficiency occurs only on one side of the zeroth order beam as the RF frequency is swept from minimum to maximum. On the opposite side of zero order the Bragg condition is satisfied for only one frequency. As the RF frequency is repetitively swept across the entire range, the position for high diffraction efficiency will change in response to mechanically rotating the deflector.

In linear scanning applications where T, total scan time, is short, a frequency gradient is produced across the optical aperture. The frequency gradient acts like a cylinder lens of fixed focal length fl=V T/68, either converging or diverging the diffracted beam. If total scan time T is short, the cylinder effect will preclude bi-directional scanning. The effect can be compensated for in a unidirectional fixed scan rate system by adjusting the beam shaping optics used to expand D for resolution purposes.

Multiple beam generation is detailed next. Every acoustic frequency in an acousto-optic device defines a unique angular beam position. If several acoustic frequencies are applied simultaneously to the acousto-optic device, a corresponding number of diffracted beams will be created.

Separation between beams is $$\Delta\theta = \lambda \Delta F/V$$

where $\Delta F$ is the acoustic frequency difference between diffracted beams. Each beam can be modulated independently but the intensities of the beams are interrelated.

One AOD deflector embodiment operates at 40 MHz and 60 MHz with high efficiency and equal intensity. Optical grade, single crystal Germanium is used for the interaction medium and Lithium Niobate piezoelectric transducers are used to generate the RF frequency acoustic traveling wave inside the Germanium.

The RF center frequency of operation is 50 MHz and the height of the sound field or active aperture is 10 mm. RF frequencies of operation are 40 MHz and 60 MHz. The Germanium optical surfaces are coated with a multi-layer dielectric antireflection coating designed for operation at 9.4 μm. In this embodiment, the pulse rise time, Tr (10% to 90%), and depth of modulation are determined by the light beam diameter D. For Model AGD-5147 with acoustic velocity V=5.5 mm/μsec $$Tr=117D \text{ nsec}$$

where D is in mm. Modulation response for sinusoidal inputs can be calculated as $$M=\exp(-4.08\times10^{-2}D^2 f_m^2)$$

where D is beam diameter in mm and fm is modulation frequency in MHz. For a deflector, a large beam width is required to obtain full resolution. This precludes operation as a high speed modulator.

The frequency shift range is plus or minus 40 MHz to 60 MHz depending on whether the plus or minus diffracted order is used. The Deflector produces two first order, diffracted, optical beams with an angular separation of 34.2 mrad. At 9.4 um, a frequency deviation of 20 MHz centered at 50 MHz will produce an angular separation of 34.2 milliradians centered 85.4 milliradians from the undeflected light. The two optical beams can be individually amplitude modulated.

The optical beam is aligned parallel to the sound field and adjust the vertical position to assure that the total optical beam is in the sound field. Initially, set the device 10 optical face nearly normal to the light beam, apply 50 watts RF power at 60 MHz and rotate the device to adjust the Bragg angle so that optimum first order light intensity is obtained. Change RF frequency to 40 MHz with 50 watts RF power and note the diffraction efficiency. The 40 MHz and 60 MHz efficiencies should be close. Slightly adjust the Bragg angle condition so that equal intensities are obtained at both RF frequencies. After equal intensities are obtained, adjust RF drive power to 120 Watts. Once again check both efficiencies. A slight adjustment may be needed to obtain equal intensities. The zero and unwanted diffraction orders can be spatially filtered with an aperture.

The device of FIG. 1 can be used in a number of applications. For example, the device can be used in laser modulators and deflectors which are devices used in laser systems to modify the behavior of laser beams. The laser modulator is a device that changes the properties of a laser beam as it propagates through a medium. It can be used to control the intensity, phase, or polarization of the beam. The modulators can be made using materials that have nonlinear optical properties, such as lithium niobate, which allows for the manipulation of the laser beam. The laser deflector is a device that changes the direction of a laser beam. It can be used to steer the beam to a particular location or to scan the beam over a surface.

Figure 5:
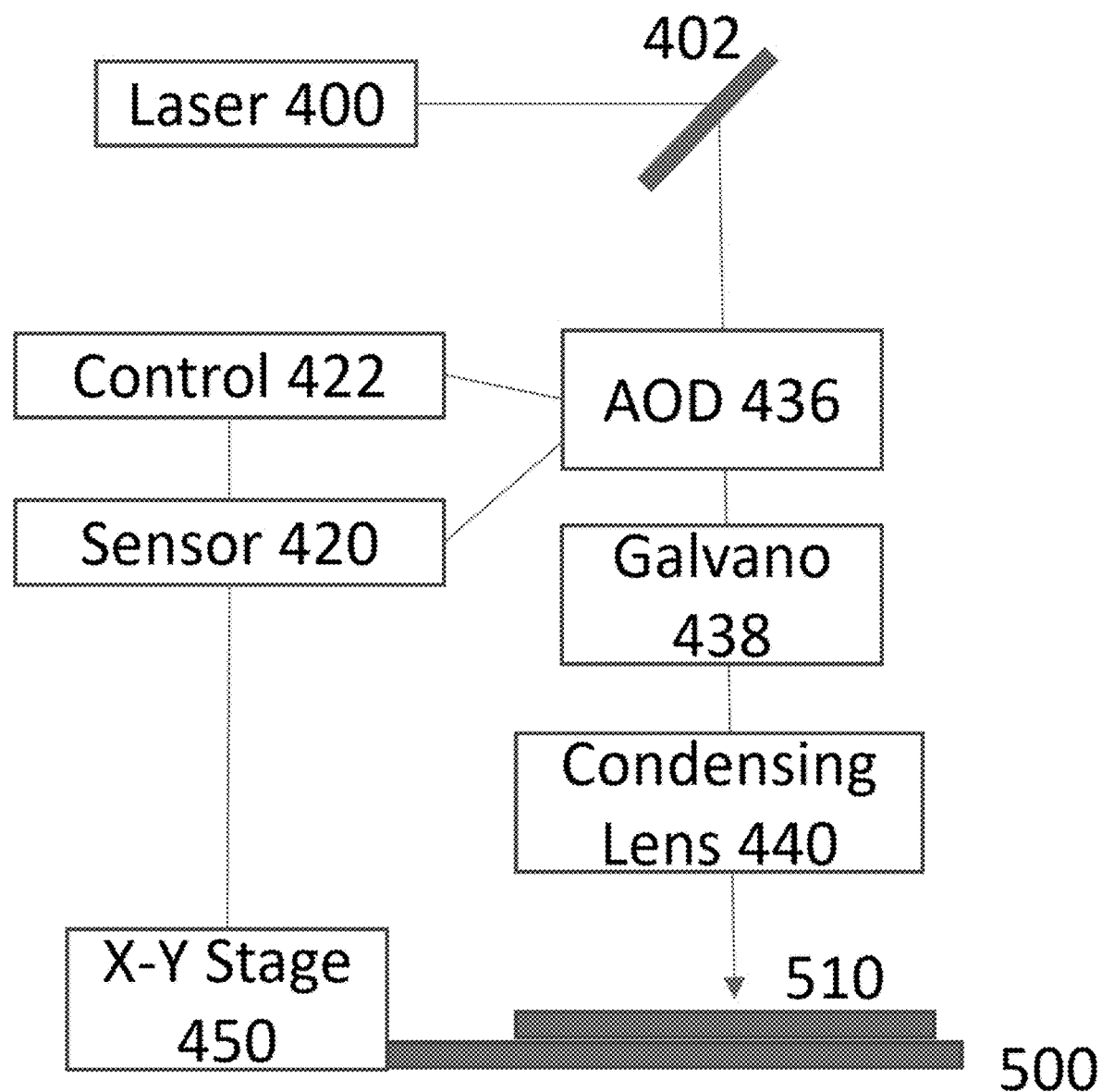
FIG. 5 shows an exemplary laser system with a phased-array AOD to work on an electronic circuit.
Figure 6:
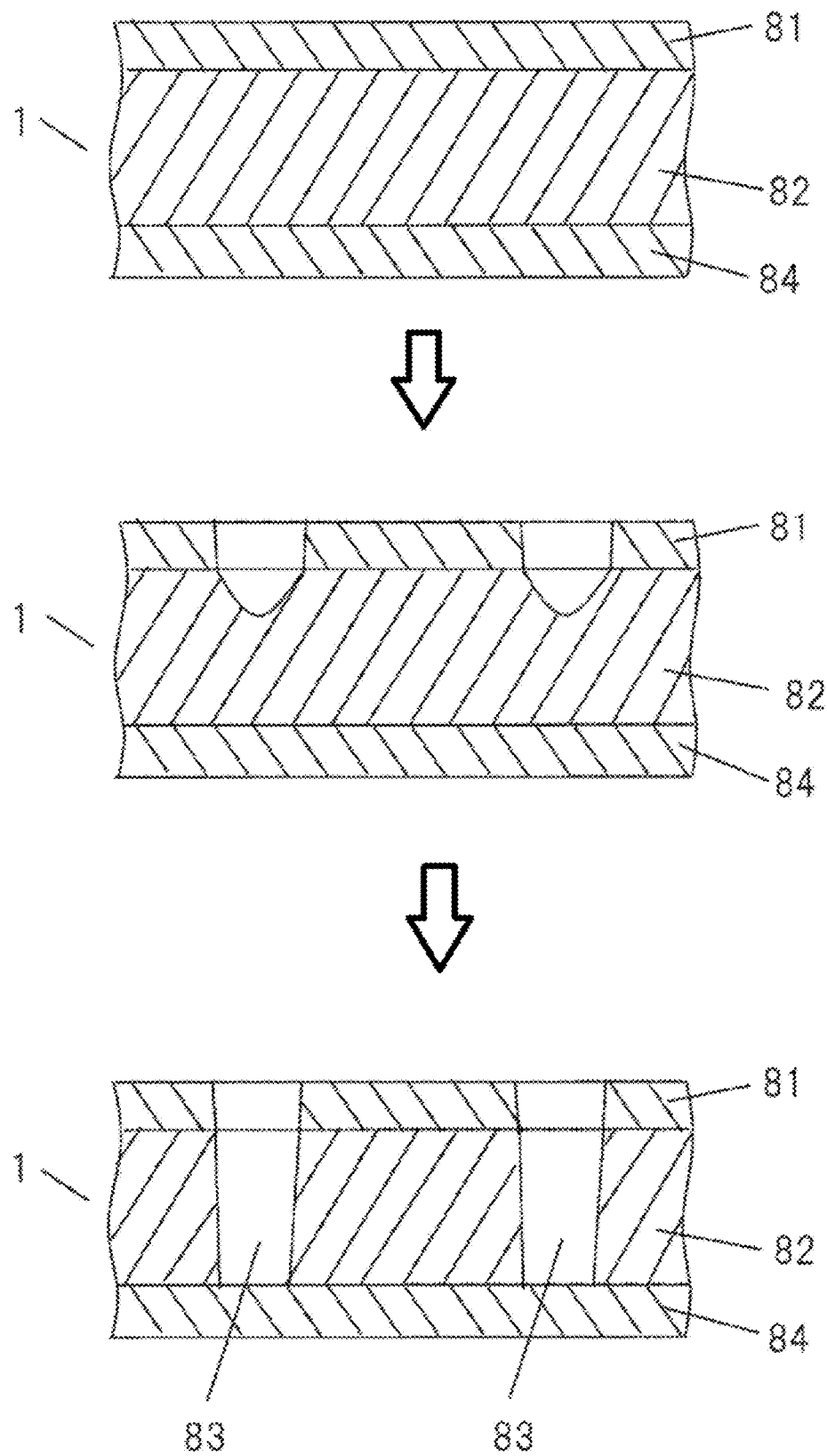
FIG. 6 shows a partial via formed using the instant laser system.

FIG. 5 shows an exemplary laser apparatus for laser cutting, marking, and welding applications. The use of AODs in these machines allows for precise and efficient laser beam steering, which is critical for high-quality laser processing.

In the manufacture of printed circuit boards (PCBs), vias are holes that are drilled through the board to connect different layers of the circuit. Traditionally, the holes are made using a mechanical drilling process, which involves drilling the holes using a drill bit. However, this process has some limitations, which has led to the need for laser drilling in PCB via hole making. One of the main problems with mechanical drilling is that it is difficult to create small, precise holes with high aspect ratios (the ratio of the hole depth to the diameter). As PCBs have become smaller and more complex, the demand for small, high-density vias has increased. Mechanical drilling can struggle to achieve the necessary precision and aspect ratios for these vias, leading to issues with signal integrity and manufacturing yield.

Laser drilling, on the other hand, can achieve high aspect ratios and precise, small holes with greater accuracy and consistency. Laser drilling uses a focused laser beam to ablate material from the PCB substrate, creating the via hole. The laser beam can be precisely controlled to create holes of different sizes and shapes with high accuracy. In a laser drilling embodiment, the laser beam is first expanded and collimated to ensure a uniform beam profile. The beam is then directed towards an AOD, which is used to deflect the laser beam in the desired direction. The AOD is controlled by an RF signal, which controls the frequency of the acoustic wave and thus the deflection angle of the laser beam. The deflected laser beam is then directed towards a set of galvanometer mirrors, which are used to further steer the beam to the desired location on the PCB. The combination of the AOD and galvanometer mirrors allows for precise and efficient laser beam steering, which is essential for high-quality laser drilling.

In laser drilling, the laser oscillator control unit is responsible for controlling the laser oscillator to emit laser pulses that are then directed towards the acousto-optic deflector (AOD) for beam steering. Here's a detailed breakdown of one system shown in FIG. 5:

Laser Oscillator and Control Unit 400: A laser 400 and a laser oscillator control unit is the first component in the system. It is responsible for controlling the laser, which generates the laser beam. The control unit ensures that the laser oscillator emits laser pulses at the correct frequency, duration, and energy level for the desired application.

Beam Splitter 402: After the laser oscillator emits laser pulses, the beam is directed towards a beam splitter. The beam splitter is a partially reflective surface that separates the laser beam into two beams. One beam is directed towards the AOD deflector, while the other beam is directed towards a power monitor, which measures the laser pulse energy.

Acousto-Optic Deflector (AOD) 436: The AOD uses an acoustic wave to diffract the laser beam at a specific angle. The AOD is controlled by an RF signal, which controls the frequency of the acoustic wave and, consequently, the angle of the deflected laser beam. In particular the AOD 436 is a single unit that has steps on the surface that can be tuned to be responsive to multiple frequencies.

Phased Array AODs: Phased array AODs are devices that use multiple piezoelectric transducers to generate acoustic waves that can deflect and steer laser beams. By controlling the phase and amplitude of the acoustic waves, phased array AODs can deflect the laser beam in a controlled manner. Phased array AODs can be designed with multiple frequency response capabilities, which means they can operate at different frequencies to achieve different deflection angles. This enables more precise control over the laser beam and can improve the accuracy and quality of laser drilling.

Damper: The laser beam deflected by the AOD may have residual vibrations that need to be damped to ensure accurate laser processing. The damper, located after the AOD, is used to reduce these vibrations and stabilize the beam.

Galvano Deflection Unit 438: The laser beam is then directed towards a galvano deflection unit. This unit consists of a pair of mirrors that are rotated at high speeds to steer the laser beam in the desired direction. The galvano deflection unit provides fine-tuned control of the laser beam, allowing for precise positioning of the beam on the target.

Condensing Lens 440: Finally, the laser beam is directed towards a condensing lens. The condensing lens is used to focus the laser beam to a small spot size, which is essential for high-precision laser drilling. The condensed laser beam is then directed towards the target material 510 (such as a PCB), where it is used to create small holes or remove material in a controlled manner.

The laser oscillator control unit, beam splitter, AOD deflector, damper, galvano deflection unit, and condensing lens work together to provide precise laser beam steering and control in laser drilling applications.

In laser machining applications, the laser beam is often guided over a table driving unit to enable precise movement of the workpiece or the laser beam itself. Here's a detailed breakdown of how the laser beam is guided over a table driving unit:

Laser Beam Source 400: The laser beam is generated by a laser beam source, which can be a solid-state, gas, or fiber laser. The laser beam source emits a high-intensity laser beam that is then directed towards the table driving unit. The laser may be a non-excimer laser, selected from one of a non-diode pumped high powered Nd:YAG solid state laser and a Nd:YLF solid stated laser, and a Nd:YAP solid state laser and a Nd:YVO4 solid state laser wherein the selected laser operates at a repetition rate >1 kHz in a range of operational wavelengths from 180 nm to 4000 nm, or a diode pumped rare earth doped fiber laser wherein the pump diode is selected from a group of diodes have a core material selected from one of SiO2 and Aluminosilicate and Phosphate glass and Glass and Ge02 and wherein the dopant is selected from one of Erbium (Er) and Er/La and Ytterbium (Yb) and Tm and Tm-Ho and Samarium and Er-Yb and Neodymium (Nd) and Terbium-Ytterbium.

Beam Delivery System: The laser beam is typically guided through a beam delivery system consisting of mirrors, lenses, and other optical components. The beam delivery system is used to shape and direct the laser beam towards the table driving unit.

X-Y stage or Table Driving Unit 450: The table driving unit is a precision device that is used to move the workpiece or the laser beam in a precise manner. The table driving unit typically consists of a motion controller, motorized linear stages, and rotary stages. The motion controller receives input from the operator or a computer program and translates that input into precise movements of the table.

Laser Beam Guidance System: In some laser machining applications, the laser beam is guided over the table driving unit using a laser beam guidance system. This system typically consists of a series of mirrors, lenses, and other optical components that are used to steer and direct the laser beam over the workpiece.

Workpiece: The workpiece is the PCB material 510 that is being processed by the laser beam. The workpiece is typically placed on the table driving unit and held in place using a clamping or fixing mechanism.

Laser Machining Process: Once the workpiece is in place and the laser beam is guided over the table driving unit, the laser machining process can begin. The laser beam is used to remove material from the workpiece in a controlled manner, either by ablation or melting. The table driving unit is used to move the workpiece or the laser beam in a precise manner to achieve the desired machining results.

Overall, the laser beam is guided over a table driving unit using a combination of precision motion control, laser beam guidance systems, and other optical components. This enables precise laser machining of workpieces with high accuracy and repeatability. The use of phased array acousto-optic deflectors (AODs) with multiple frequency response can improve laser drilling machines in several ways. Here's a detailed breakdown of how the instant phased-array AOD works and benefits laser drilling machines:

Laser Drilling Process: In laser drilling applications, the laser beam is used to drill holes in a variety of materials. The laser beam is typically guided over the workpiece using mirrors and other optical components. By using a phased array AOD with multiple frequency response, the laser beam can be deflected and steered more precisely, which can improve the accuracy and quality of the drilling process.

Reduced Drilling Time: Phased array AODs with multiple frequency response can also reduce drilling time by enabling faster and more efficient drilling. By quickly and accurately deflecting the laser beam, these devices can help reduce the time it takes to drill a hole, which can increase productivity and reduce costs.

Improved Reliability: Phased array AODs with multiple frequency response can also improve the reliability of laser drilling machines by reducing wear and tear on mechanical components. By using an electronic device to deflect and steer the laser beam, the need for mechanical components can be reduced, which can improve the overall reliability of the machine.

The use of phased array AODs with multiple frequency response can improve laser drilling machines by enabling more precise control over the laser beam, reducing drilling time, and improving reliability. These benefits can help increase productivity, reduce costs, and improve the quality of the drilling process.

Laser drilling also offers other advantages in PCB manufacturing, including the ability to drill through a wide range of materials, such as ceramics and metals, and the ability to create blind and buried vias, which are difficult to achieve with mechanical drilling.

Laser drilling machines that incorporate phased array acousto-optic deflectors (AODs) offer superior precision and control in creating via holes in printed circuit boards (PCBs).

The use of multiple frequency response in phased array AODs enables the laser beam to be deflected with greater accuracy and efficiency, resulting in faster and more precise hole creation.

Compared to traditional mechanical drilling, laser drilling machines with phased array AODs can achieve higher aspect ratios and smaller hole diameters, resulting in higher density and higher performance PCBs.

The ability to precisely control the laser beam through the use of phased array AODs can also reduce the risk of heat damage to surrounding materials and components during the drilling process.

The use of phased array AODs in laser drilling machines can improve the manufacturing yield and reduce the costs associated with producing high-density PCBs, while also improving the reliability and performance of electronic devices.

The AOD is ideal in laser-based drilling applications, such as drilling small-diameter vias in printed circuit boards (PCBs). These devices are capable of deflecting and modulating laser beams in a highly precise and controllable manner, which makes them ideal for use in applications that require high-speed and high-accuracy drilling.

In one embodiment, the system produces a fiber laser beam output consisting of a sequence of one to more Pulse stacks. This method involves generating multiple sequences (or laser beam pulses) from a fiber laser. Each sequence is separated by a repetition interval, and then combining them into at least one beam of light on one location on a PCB, for example. The interval between pulses of each Pulses, the initial firing time and the repetition rate of each pulse of each sequence determine stack.

In another embodiment, a method includes producing a fiber laser beam output consisting of a sequence of one to more pulse stacks. This method involves generating multiple sequences (or laser beam pulses) from a fiber laser. Each sequence is separated by a repetition interval, and then combining them into at least one. Pulse stack output includes a beam of laser light pulses, and each sequence of laser beam pulses has an inter-stack interval. Pulse stacks and inter-Pulses Interval between pulses of each Pulses The initial firing time and the repetition rate of each pulse of each sequence determine stack. The plurality sequences of laser beam pulses can be generated by the following steps: driving an optical fiber to form a fiber laser cavity with a plurality pumping lasers placed in the corresponding reflective ends structures of the cavity. Each pumping laser corresponds directly to a sequence forming at least one of the laser beam pulses. The laser pumps the optic fiber using a sequence of pulses at a corresponding pulse Sequence repetition rate. The system then combines multiple sequences of laser beam pulses to create at least one pulse stack in the single fibre optic by injecting the pumping pulses of the pumping lasers directly into the single optical fiber, forming the resonant cavities of the fiber laser. Alternate embodiments of plurality of sequences can be generated by generating laser beam pulses using a component fiber laser. Each component fiber has an output axis, and the component lasers are arranged in a bundle in which the output axes are parallel and spaced out radially. The combining multiple sequences of laser beam pulses to create the pulsed stack can then be achieved by passing the sequences from each component fiber laser's output pulses through an optical element. This redirects the axis to a single region of another optical element, which in turn redirects the sequences into one axis output.

In one implementation, one of a continuous-wave output component, pseudo-continuous output component, and a plurality of other components can be used in the pulse sequence output generation. This involves creating a sequence in each of a plurality component fiber lasers, and then combining each sequence into one fiber laser output beam. Each of the plurality component fiber lasers is arranged in a bundle, with the output axes being parallel and spaced out radially. Combining the sequence of output components of each of several component fiber lasers into one fiber laser output beam involves the following steps: in a first optical elements, redirecting each axis from the plurality component fiber lasers to a single region of another optical element and then, in the second element, redirecting each axis from the plurality component fiber lasers into a single beam with a single axis. A further alternative embodiment of the combination of multiple component fiber laser output components into one fiber laser output beam is to optically join the outputs of all the component fiber lasers and create a single optic fibre. The output of the single optical fiber is the axis output beam. A multi-pumped fiber laser can be built with an optical fiber, an end structure, a second structure, and an output path. The first structure comprises a first optical path with a first beam splitter that connects an output from a first laser to the first optical fiber. A second optical path includes the first beam splitter to couple the first optical fiber to an optical reflector assembly in order to create a reflection end of the resonant optic cavity. The second structure has a third optical pathway that includes a second beam divider for coupling an optical fiber's output to a second optical fiber. A fourth optical path also includes the second beam splitter to couple the second optical fiber to another optical reflecting element assembly in order to create a second reflecting end to the resonant optic cavity. A third beam splitter is located in the fourth optical pathway. It allows for the coupling of an output from the second optical fiber to the fourth optical track. This will allow the fiber laser beam output to be received. Multi-pumped lasers may also include a vortex lenses element that is located between the second optical fiber end and the third and forth optical paths of second end structures. This vortex lens elements can be used to shape the energy profile for the beam output. The output path may also include a harmonic generator module for wavelength conversion of the output optical fiber, and a vortex element to shape the energy profile for the beam output. In this case, the vortex lens is located between an input and an output from the harmonic generation modules. The pulse stack may contain a plurality component fiber-lasers for producing individual sequences, and an optical structure that combines the outputs from each component fiber laser into one fiber laser output. The sequences of pulses generated by each component fiber laser are synchronized in such a way that each pulse is separated by a corresponding repetition interval. There is also an inter-stack interval that separates sequential pulses. Pulse stacks and inter-pulse interval between pulses of each pulse can be controlled fired, where the initial firing time and the repetition rate of each pulse of each sequence determine stack.

An optical junction may be connected to each component laser to combine the sequences of pulses into one optical fiber, resulting in a fiber-laser output consisting of a summation from all the pulses. Other embodiments include a plurality component fiber-lasers arranged in a bundle, where the output axes are parallel and spaced out radially. The optical structure for combining sequences of pulses is composed of an optical junction connecting each component fiber to each other. A first optical element redirects the axis and output components of the plurality into one region of a second element. This second optical element redirects the axis and output beam of each component fiber.

Another embodiment of the fiber laser produces an output laser beam that includes a sequence of at most one of a continuous-wave output component, pseudo-continuous wave output component, and a Pulses Sequence output component. The fiber laser includes a plurality component fiber lasers. Each component fiber laser produces an output component that includes at least one continuous wave output, pseudo-continuous, and a pseudo-continuous component. An optical structure and a sequence output component combine the output components from each of the plurality component fiber lasers to create a single fiber-laser output. This embodiment uses the output components of at least selected component fiber lasers to synchronize in time. The single fiber laser output contains a sequence of at most one of a continuous, pseudo-continuous, and a pulse sequence output. This optical structure may combine the output components from the component fibre lasers using an optical junction. It connects each component fiber to the other component fiber lasers to link the respective output components into one optic fiber output. The sequence includes at least one continuous wave output component as well as a pseudo-continuous wave output component. Alternately, the plurality component fibers lasers are placed in a bundle. The output axes are parallel and spaced out radially. An optical structure to combine the sequences of pulses is created. A first optical element redirects the axis for each component fiber into a single region. The second optical element redirects the axis for each component fiber laser into a single beam. Another embodiment of component fiber lasers produces a beam. Pulses The sequence output component and generation of Pulses The sequence output components of the component fiber lasers are synchronized so that a combination pulse sequence output components are made from select ones of the component fiber-lasers and combine in the fiber laser beam into at most one of a continuous or pseudo-continuous output component.

The single and multiple multi-pumped fiber lasers as described above may be used in beam generation and delivery systems, such as are used in laser micro/nano-machining systems, to generate beams comprised of stacked pulses with individual pulse durations ranging from 2 to 200 ns and wherein the pulses are stacked with a pulse separation ranging between pico seconds and several tens of nanoseconds. Such methods can generate tacks of several tens of pulses, wherein a stack is defined as a sequence of closely spaced or overlapping pulses forming an identifiable group that is separated in time, or space, from other such stacks. The length and number of pulses in each stack and the interval between stacks can thereby be determined by controlling the number of pulses, the repetition rate of each laser and the relative firing times of the lasers. It will also be appreciated that very complex sequences of pulses and stacks, including specified sequences of pulses within the stacks and selected sequences of stacks that vary over time can thereby be generated, thereby allowing the generation of sequences of pulse and stacks that are tailored to any situation.

The laser thereby generates multiple stacks of intense pulses per pulse period to increase the speed of the micro-machining process and to increase the photo disassociation of materials beyond that of standard photo ablation. The stack of pulses appears to create an intense oft punch on the material to be processes wherein the intense soft punch is significantly different from both conventional focal point machining and conventional single pulse processing. Stated another way, the stacking of pulses of short durations, such as of less than 1 nanosecond, appears to create a percussion process wherein the individual intensity of the "punches" appears to be constant but wherein their collective energy is deposited over a greater duration than each individual pulse. This is particularly useful for drilling, dicing, cutting, skiving or otherwise processing both hard materials and multi-layered materials where it is necessary to vaporize or ablate, for example, metals covering underlying polymers. This method also allows the variation of energy density without the need to vary the pulse rate, and allows single pass processing of thin films, including polymer dielectric materials as well as thin metal films or other films used in trimming resistors or fuse arrays in memory chips.

Such laser outputs may be achieved by appropriate synchronization of the diode pump lasers, such as in the case of a multi-pumped laser as described above wherein the diode pump lasers are synchronized so that the fiber laser can produce independent pulses with a specific separation. Additional pump lasers can be optically coupled into the single optical fiber or multiple fiber lasers as pumping lasers can be used for driving a bundle of optic fibers or coupled into a single optic fiber or alternatively multiple fiber lasers are combined into a bundle format to create a fiber laser gun wherein, for example, each fiber laser could be pulsed at a different frequency or frequencies to allow stacking of pulses or synchronized to form a single pulse of greater intensity. The outputs of the bundle of fiber lasers could collected and shaped using DOE/Hoe optics to form a uniform single beam, or into a collinear stacked set of illuminating beams, for, for example, processing microvias in printed circuit boards, or for fused blowing or resistor array cutting on memory chips and other semiconductor devices that need modification or trimming or re-work. This bundled configuration would also provide a unique opportunity for standard fly eye homogenizer use since the fiber laser output could be made to be multi-mode to provide greater use of standard laser imaging methods, such as mask or aperture imaging typically used on traditional UV laser-drilling or photo-lithography systems.

In the context of optics and telecommunications, modulation refers to the process of intentionally modifying a signal (e.g., light) by varying one or more of its properties, such as amplitude, frequency, or phase. This can be used for a variety of purposes, including deflection and shifting of the signal. For example, in acousto-optic modulation, a signal is deflected or shifted by using an AOD to apply a varying acoustic wave to a crystal, which in turn alters the refractive index and deflects or shifts the light passing through it. Similarly, in electro-optic modulation, a voltage is applied to a crystal to change its refractive index and modulate the light passing through it. These types of modulation can be used in a variety of applications, such as telecommunications, signal processing, and laser machining.

The basic principle behind the operation of a phased-array AOD is the use of an acoustic wave to control the phase of a laser beam as it passes through a crystal. The crystal is typically made of a material such as tellurium dioxide, which has a high acoustic velocity and a high refractive index. When an acoustic wave is generated in the crystal, it creates a periodic variation in the refractive index of the crystal that can be used to modulate the phase of the laser beam. In the phased-array AOD, multiple transducers are used to generate an acoustic wave that travels through the crystal at different angles. By varying the frequency and phase of the acoustic wave, it is possible to control the deflection angle and intensity of the laser beam. This enables the laser beam to be steered and focused with high precision, which is critical for applications such as PCB via drilling. In PCB via drilling, the laser beam is focused onto a small spot on the surface of the PCB using a lens. The phased-array AOD is then used to control the position and intensity of the laser beam as it is scanned across the surface of the PCB. By rapidly modulating the phase and intensity of the laser beam using the phased-array AOD, it is possible to drill small-diameter vias with high aspect ratios in a highly precise and efficient manner. The phased-array AOD for PCB via drilling provides the ability to rapidly scan the laser beam across the surface of the PCB. This allows for high-speed drilling of multiple vias in a single pass, which reduces the overall processing time and increases the throughput of the drilling process. Additionally, the use of a phased-array AOD enables the laser beam to be precisely focused and steered, which reduces the risk of damage to the surrounding materials and components during the drilling process.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A laser apparatus, comprising:
   a laser oscillator to generate a laser beam;
   a beam splitter;
   a phased array acousto-optic deflector (AOD) with multiple frequency responses in one device, wherein the AOD comprises a plurality of transducers electrically coupled in parallel mounted on predetermined stepped positions and where the transducers are controlled by at least two input frequencies to position the laser output;
   a galvano deflection unit; and
   a condensing lens, wherein the phased array AOD is configured to control the direction and focus of the laser beam at multiple frequencies to deflect the laser beam.

2. The apparatus of claim 1, comprising a damper.

3. The apparatus of claim 1, comprising a table driving unit for guiding the laser beam over a surface of a printed circuit board, wherein the precise control of the laser beam provided by the phased array AOD reduces the risk of heat damage to surrounding materials and components.

4. The apparatus of claim 1, wherein the AOD comprises:
   an optical element having a surface with one or more steps formed thereon;
   a conductive layer formed on the surface with the steps;
   one or more crystals secured to each step; and
   electrodes positioned on each surface of each crystal.

5. The apparatus of claim 1, comprising a tuning element to match a predetermined impedance.

6. The apparatus of claim 1, comprising a tuning element providing an output impedance of 50 ohms.

7. The apparatus of claim 1, comprising a tuning element including inductive and capacitive passive components.

8. The apparatus of claim 1, comprising tuning element comprises 1:1 balun, 4:1 transformer, a capacitor, and an inductor.

9. The apparatus of claim 1, wherein the AOD comprises a slanted end.

10. The apparatus of claim 9, wherein the slanted end comprises a compound angle to move reflected sound field out of a laser beam working range.

11. The apparatus of claim 1, wherein the slanted end forms a 30 degree angle measured from a long side of the optical element to a short side of the optical element.

12. The apparatus of claim 1, wherein a surface of the slanted end comprises a 2 degree slope.

13. The apparatus of claim 1, wherein the AOD comprises germanium, tellurium dioxide (TeO2), lithium niobate, PZT, fused silica, chalcogenide glasses, glass.

14. The apparatus of claim 1, wherein the laser beam generates a series of pulses aimed at a hole on the circuit, wherein the hole begins on one side of the circuit but does not exit the other side of the circuit.

15. A method to operate on an electronic circuit, comprising:
   positioning the electronic circuit on a table driving unit;
   applying a laser beam, a beam splitter, a phased array acousto-optic deflector (AOD) with one or more transducers electrically coupled in parallel, a damper, a galvano deflection unit, and a condensing lens to generate one or more laser beams directed at the electronic circuit, wherein the AOD includes transducers electrically coupled in parallel mounted on predetermined stepped positions and where the transducers are controlled by at least two input frequencies to position the laser output;
   impedance matching the at least two input frequencies of the transducers to a predetermined load;
   generating a sound field in the phased array acousto-optic deflector to deflect a laser beam based the at least two input frequencies;
   and
   controlling a direction and focus of the laser beam using the phased array AOD to cut or create a hole or a via portion in the electronic circuit.

16. The method of claim 1, comprising matching the input of the transducers to a predetermined impedance.

17. The method of claim 15, comprising providing a tuning element coupled to the transducers with an output impedance of 50 ohms.

18. The method of claim 15, comprising tuning element comprises a 1:1 balun, a 4:1 transformer, a capacitor, and an inductor.

19. The method of claim 15, wherein the optical element comprises a slanted end, wherein the slanted end comprises a compound angle to move reflected sound field out of a laser beam working range, wherein the slanted end forms a 30 degree angle measured from a long side of the optical element to a short side of the optical element, and wherein a surface of the slanted end comprises a 2 degree slope.

20. The method of claim 15, comprising generating a series of pulses aimed at a hole on the circuit, wherein the hole begins on one side of the circuit but does not exit the other side of the circuit.

* * * * *